US011930074B2

(12) United States Patent
Abu Dagga et al.

(10) Patent No.: US 11,930,074 B2
(45) Date of Patent: Mar. 12, 2024

(54) CONTENT DISTRIBUTION OVER A NETWORK

(71) Applicant: KING FAHD UNIVERSITY OF PETROLEUM AND MINERALS, Dhahran (SA)

(72) Inventors: Anas A. Abu Dagga, Dhahran (SA); Ashraf S. Mahmoud, Dhahran (SA); Marwan H. Abu Amara, Dhahran (SA); Tarek R. Sheltami, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 35 days.

(21) Appl. No.: 17/943,727

(22) Filed: Sep. 13, 2022

(65) Prior Publication Data
US 2023/0135853 A1  May 4, 2023

Related U.S. Application Data

(60) Provisional application No. 63/271,894, filed on Oct. 26, 2021.

(51) Int. Cl.
*H04L 67/1074* (2022.01)

(52) U.S. Cl.
CPC .................. *H04L 67/108* (2013.01)

(58) Field of Classification Search
CPC ... H04L 67/108; H04L 67/1059; H04L 47/10; H04L 47/43; H04L 47/431; H04L 9/06;
(Continued)

(56) References Cited

U.S. PATENT DOCUMENTS 5,504,322 A * 4/1996 Pavlidis ............... G06K 7/1456
  235/494
6,126,074 A * 10/2000 He ........................... G06K 7/14
  235/494

(Continued)

OTHER PUBLICATIONS

Barekatain, et al. ; MATIN: A Random Network Coding Based Framework for High Quality Peer-to-Peer Live Video Streaming ; PLOS One 8(8) ; 17 Pages.

(Continued)

*Primary Examiner* — Thu Ha T Nguyen
(74) *Attorney, Agent, or Firm* — Oblon, McClelland, Maier & Neustadt, L.L.P.

(57) ABSTRACT

A device, a method, and a non-transitory computer readable medium for distributing content to a plurality of nodes on a computer network are disclosed. The method includes dividing the content into a plurality of information groups, each of the information groups including a mutually exclusive subset of information pieces of the content, encoding the information pieces included in each of the plurality of information groups based on a combination of the information pieces included in the respective information group and a plurality of coefficients associated with the information pieces included in the respective information group, and distributing the encoded information pieces to the plurality of nodes on the computer network, wherein each of the information pieces is encoded into one of three types of information pieces.

20 Claims, 19 Drawing Sheets

(58) Field of Classification Search
CPC ..... H04L 9/0618; H04L 9/0625; H04L 9/085; H04L 12/2838; H04L 49/3072
USPC ........................................ 709/200, 201, 202
See application file for complete search history.

(56) References Cited

U.S. PATENT DOCUMENTS

| | | | | |
|---|---|---|---|---|
| 8,031,866 | B2* | 10/2011 | Shirai | H04L 9/002 713/189 |
| 9,906,360 | B2* | 2/2018 | Johnson | H04L 9/0631 |
| 11,089,095 | B1* | 8/2021 | Henkens | H04L 67/1051 |
| 11,431,488 | B1* | 8/2022 | Sapuntzakis | H04L 9/085 |
| 2008/0050025 | A1* | 2/2008 | Bashyam | H04N 19/172 382/233 |
| 2010/0049869 | A1* | 2/2010 | Jayaram | H04L 45/028 709/204 |
| 2012/0321001 | A1 | 12/2012 | Raveendran et al. | |
| 2013/0159732 | A1* | 6/2013 | Leoutsarakos | H04L 9/085 713/193 |
| 2014/0237614 | A1* | 8/2014 | Irvine | H04L 63/083 726/26 |
| 2015/0067875 | A1* | 3/2015 | Johnson | H04L 9/0631 726/26 |
| 2015/0356084 | A1* | 12/2015 | Stephenson | G06F 16/4387 707/736 |
| 2016/0344546 | A1* | 11/2016 | Resch | G06F 21/6218 |
| 2016/0350520 | A1* | 12/2016 | Michiels | H04L 9/06 |
| 2017/0141911 | A1* | 5/2017 | Michiels | H04L 9/0625 |
| 2017/0235848 | A1* | 8/2017 | Van Dusen | G06Q 30/0201 705/12 |
| 2017/0264430 | A1* | 9/2017 | Robertson | H04L 9/0869 |
| 2018/0332147 | A1 | 11/2018 | Park et al. | |
| 2019/0056868 | A1* | 2/2019 | Cabral | G06F 3/0644 |
| 2019/0104121 | A1* | 4/2019 | Khandani | H04L 9/0891 |
| 2019/0190979 | A1 | 6/2019 | Xu et al. | |
| 2020/0050959 | A1* | 2/2020 | Ashrafi | H04L 9/0852 |
| 2022/0108262 | A1* | 4/2022 | Cella | G06Q 10/063118 |
| 2023/0336567 | A1* | 10/2023 | Gvili | H04L 9/085 |
| 2023/0370252 | A1* | 11/2023 | Kawaguchi | G09C 1/00 |

OTHER PUBLICATIONS

Lei, et al. ; Network Coding for Effective NDN Content Delivery: Models, Experiments, and Applications ; 2015 44th International Conference on Parallel Processing ; 11 Pages.

* cited by examiner

CONTENT DISTRIBUTION OVER A NETWORK

CROSS-REFERENCE TO RELATED APPLICATION

This present application claims the benefit of priority to U.S. Provisional Application No. 63/271,894, "SUPER GENERATION NETWORK CODING FOR PEER-TO-PEER CONTENT DISTRIBUTION NETWORKS," filed on Oct. 26, 2021, which is incorporated by reference herein in its entirety.

STATEMENT REGARDING PRIOR DISCLOSURE BY INVENTORS

Aspects of the present disclosure were described in Abudaqa, A. A., Mahmoud, A., Abu-Amara, M., & Sheltami, T. R. (2020). Super Generation Network Coding for Peer-to-Peer Content Distribution Networks. IEEE Access, 8, 195240-195252.

BACKGROUND

Technical Field

The present disclosure is directed to a peer-to-peer content distribution technique in which content is distributed among a plurality of nodes over a computer network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Peer-to-peer (P2P) content distribution is a computing model that allows the distribution of files, videos, softwares or other applications among a plurality of users. In P2P, a single server (also known as the seeder) distributes a large file to a large number of interested peers over an intranet or the Internet. In P2P, instead of uploading the file to every single peer, the server first fragments the file into data packets, and then distributes these data packets with participating peers. The participating peers are capable of exchanging these received data packets with one another, and therefore significantly reducing the download time for each peer and alleviating the pressure on the single server.

However, Peer-to-peer (P2P) content distribution such as BitTorrent suffers from a lot of problems such as piece scheduling policy (a situation in which some pieces owned by a peer are not any more significant to the other peers, or pieces that are needed by many peers are either very rare or not available within the network), and a situation in which a peer depart suddenly results in affecting a download time or preventing a completion of the download.

To overcome aforementioned problems, Dense Network Coding (DNC) has been proposed in the conventional techniques. In DNC, a network node is capable of linearly combining the incoming data packets and sending the combined packet to the next node. The network coding brings computational complexity as this uses linear algebra in encoding and decoding. Further, the network coding essentially requires an additional computation overhead.

Due to huge computational overhead, the network coding is not viable for real-world systems. As an improvement, many schemes such as subsequently, sparse, generations, and overlapped generations network coding are also present, but these schemes yield reduced performance as compared to the DNC.

Hence, there is a need for data communication protocol/scheme which can control the number of the generations and also provides the best physical generation size for distribution over a network.

SUMMARY

In an exemplary embodiment, a method of distributing content to a plurality of nodes on a computer network, is disclosed. The method includes dividing the content into a plurality of information groups, each of the information groups including a mutually exclusive subset of information pieces of the content, encoding the information pieces included in each of the plurality of information groups based on a combination of the information pieces included in the respective information group and a plurality of coefficients associated with the information pieces included in the respective information group, distributing the encoded information pieces to the plurality of nodes on the computer network, wherein each of the information pieces is encoded into one of three types of information pieces, all the coefficients associated with a first type of the three types of information pieces are one, a subset of the coefficients associated with a second type of the three types of information pieces is from a Galois Field and the remaining coefficients associated with the second type of the three types of information pieces are one, and all the coefficients associated with a third type of the three types of information pieces are from the Galois Field.

In another exemplary embodiment, a system for distributing content to a plurality of nodes on a computer network is disclosed. The system includes a processing circuitry configured to divide the content into a plurality of information groups, each of the information groups including a mutually exclusive subset of information pieces of the content, to encode the information pieces included in each of the plurality of information groups based on a combination of the information pieces included in the respective information group and a plurality of coefficients associated with the information pieces included in the respective information group, and to distribute the encoded information pieces to the plurality of nodes on the computer network, wherein each of the information pieces is encoded into one of three types of information pieces, all the coefficients associated with a first type of the three types of information pieces are one, a subset of the coefficients associated with a second type of the three types of information pieces is from a Galois Field and the remaining coefficients associated with the second type of the three types of information pieces are one, and all the coefficients associated with a third type of the three types of information pieces are from the Galois Field.

In another exemplary embodiment, a non-transitory computer-readable medium storing instructions, which when executed by a processor, cause the processor to perform a method of distributing content to a plurality of nodes on a computer network. The method includes dividing the content into a plurality of information groups, each of the information groups including a mutually exclusive subset of information pieces of the content, encoding the information pieces included in each of the plurality of information groups based on a combination of the information pieces included in the respective information group and a plurality of coefficients associated with the information pieces included in the respective information group, distributing the encoded information pieces to the plurality of nodes on the computer network, wherein each of the information pieces is encoded into one of three types of information pieces, all the coefficients associated with a first type of the three types of information pieces are one, a subset of the coefficients associated with a second type of the three types of information pieces is from a Galois Field and the remaining coefficients associated with the second type of the three types of information pieces are one, and all the coefficients associated with a third type of the three types of information pieces are from the Galois Field.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
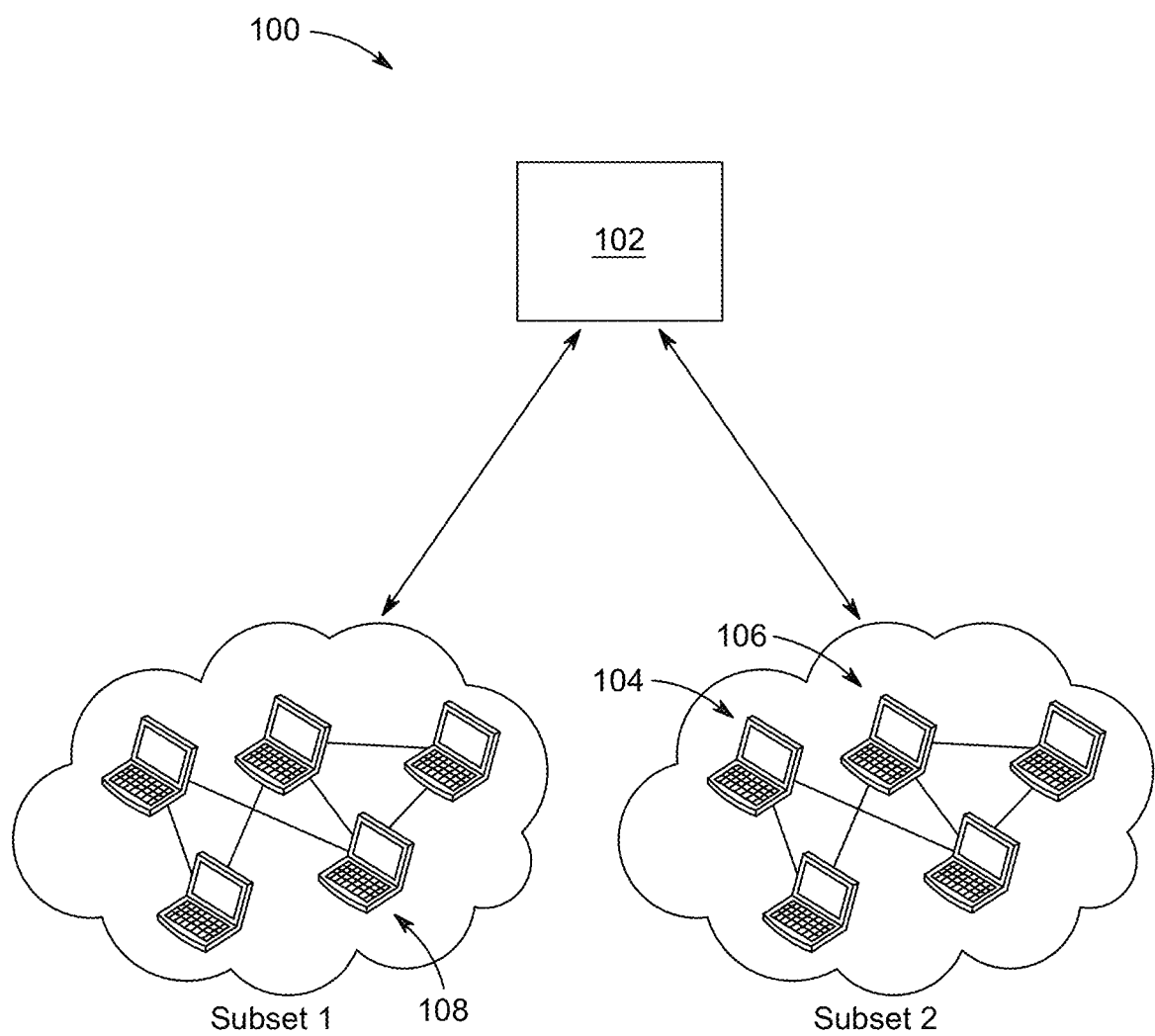
FIG. 1 illustrates a block diagram of a system for distributing content to a plurality of nodes on a computer network, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As a definition, the "peer-to-peer (P2P)" expression is to be understood as a way to refer to any type of loosely coupled networks. Expressions such as "peer", "peer-to-peer client", "node", or "client" have to be broadly understood as corresponding to a user (human being or bot, individual or group, network or sub network, etc.) generally equipped with software adapted or designed for file sharing or download/upload purposes. In the description "peer" and "node" are synonyms. The words "owner" and "seeder" refer to the same concepts. A "seeder" is a node which shares its files (enabling uploading). An "owner", as understood by the present disclosure, does its best to maintain its status as "seeder".

Aspects of this disclosure are directed to a system, a method, and a non-transitory computer readable medium for distributing content to a plurality of nodes on a computer network. The disclosure provides a solution for distributing content by disclosing a network coding (super generation network coding) that determines a proper physical generation size for content distribution and maintains the computational cost at a reasonable level. Further, the disclosed network coding scheme boosts the robustness of the network by improving diversity and availability of the data packets to be shared over the network.

In various aspects of the disclosure, non-limiting definitions of one or more terms that will be used in the document are provided below.

A term "Galois field" may be defined as a field that contains a finite number of elements.

In order to minimize the computational complexity of network coding in a P2P content distribution system, information pieces of a content are partitioned into mutually exclusive subsets referred to as groups or generations, and the network coding is done only within each generation. This approach scales down the encoding and decoding problem from the whole file size to the generation size.

In order to overcome the aforementioned drawbacks, the present system describes an improved applicable network coding scheme for P2P content distribution systems (referred to as Super Generation Network Coding (SGNC)). SGNC extends the generation size to be bigger than the generation size used in conventional generation network coding schemes (referred to as the best generation size) while maintaining almost the same decoding computation time and complexity. For example, the generation size in SGNC is at least double of the best generation size (e.g., 40 MB). As a result, the SGNC outperforms the conventional and previous coding-based schemes for P2P content distribution systems in terms of content availability, download time, overhead, and decodability for all piece scheduling policies.

FIG. 1 illustrates a block diagram of a system 100 for distributing content to a plurality of nodes on a computer network, according to one or more aspects of the present disclosure.

As shown in FIG. 1, the system 100 includes a processing circuitry 102 and a plurality of nodes (104, 106, 108). In an aspect of the present disclosure, a server may be optional. The plurality of nodes (also known as peers) may be configured to communicate with each other for exchanging files over the computer network. In an embodiment, the server 100 and/or each of the plurality of nodes (104, 106, 108) can include a processing circuitry 102. In another embodiment, a group of inter-connected peers/nodes is configured as a swarm (for example, subset 1, or subset 2) and the peers/nodes associated with the swarm are called neighbors. Multiple swarms form a dynamic logical network. According to an aspect of the present disclosure, each of the plurality of nodes (104, 106, 108) is a computing device. In an embodiment, each of the plurality of nodes (104, 106, 108) is assigned with a respective number, where the respective number varies over time, nodes joining or leaving the network over time.

The computing device may be implemented as a server, such as a file server, a database server, an application server, a WEB server, etc., or as part of a small-form factor portable (or mobile) electronic device, such as a cellular telephone, a Personal Digital Assistant (PDA), a personal media player device, a wireless WEB-watch device, a personal headset device, an application specific device, or a hybrid device that include any of the above functions. The computing device may also be implemented as a personal computer including both desktop and notebook computer configurations. The computing device may be a general-purpose computer or a specially designed computer for classification of the geological images.

In an embodiment, the two nodes (e.g., a sender and a receiver) communicate with each via a processing circuitry such as the processing circuitry 102. In an embodiment, the processing circuitry 102 is configured to receive content from the sender. In an aspect of the present disclosure, the sender may be a server, or a participating peer. After receiving the content from the sender, the processing circuitry 102 divides the content into a plurality of information groups. Each of the information groups includes a mutually exclusive subset of information pieces of the content. In an embodiment, the processing circuitry 102 stores the received content into a memory, that is operatively coupled to the processing circuitry 102. After dividing the content, the processing circuitry 102 encodes the information pieces included in each of the plurality of information groups. The processing circuitry 102 encodes each information piece based on a combination of the information pieces included in the respective information group and a plurality of coefficients associated with the information pieces included in the respective information group.

In an embodiment, each of the information pieces is encoded into one of three types of information pieces. In a first type of information piece (unity piece), all the coefficients are one. The unity piece is encoded by multiplying each plain piece of the generation by 1. The form of unity piece is (A+B+C+ . . . +Z). The unity piece is unique and basic for every generation.

Figure 2A:
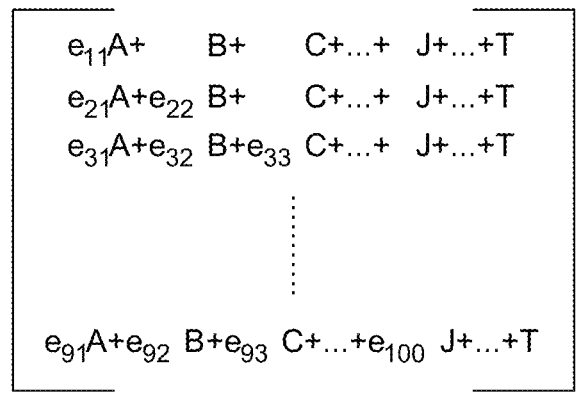
FIG. 2A illustrates a lower triangular form of a second type of information piece, according to certain embodiments.
Figure 2B:
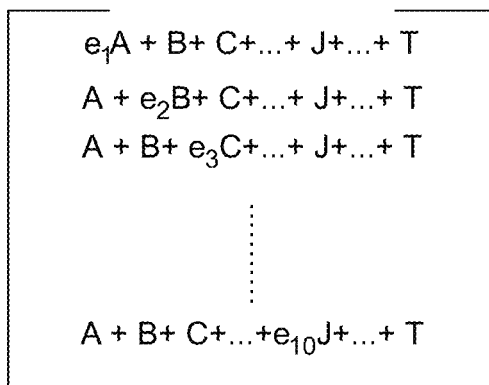
FIG. 2B illustrates a Diagonal form of a second type of information piece, according to certain embodiments.
Figure 2C:
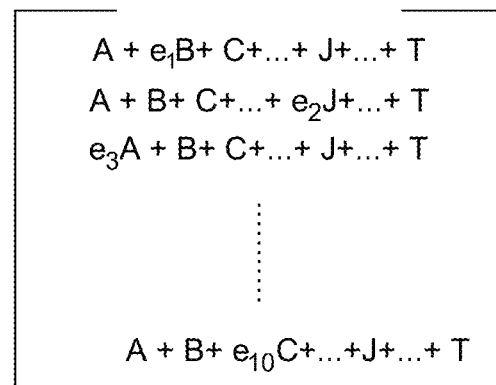
FIG. 2C illustrates a random form of a second type of information piece, according to certain embodiments.

FIG. 2A, FIG. 2B, and FIG. 2C illustrate various forms of a second type of information piece, according to certain embodiments. In the second type of information piece (also referred to as decodable piece), a subset of the coefficients associated with the second type of information pieces is from a Galois Field, and the remaining coefficients associated with the second type of the three types of information pieces are one. In the second type of information piece, a number of the subset of the coefficients that is associated with the second type of information pieces and from the Galois Field is one.

The decodable piece is encoded by multiplying a plain piece of the generation by a coefficient e drawn from GF(q), while the remaining pieces of the generation each is multiplied by 1. The decodable piece (e.A+B+C+ . . . +Z) is instantaneously decoded by using an exclusive OR operation (XORing) with the unity piece (first type of information piece). The decodable piece may have many forms such as lower triangular, diagonal, or random (as shown in FIG. 2A, FIG. 2B, and FIG. 2C, respectively). In an embodiment, the coefficient is placed such that consecutive decodable pieces are arranged diagonally as they can be arranged randomly (as shown in FIG. 2B). In another embodiment, the consecutive decodable pieces are lower-triangular provided that a decodable piece is decoded as early as possible (as shown in FIG. 2C).

In the third type of information piece (also referred to as rich piece), all the coefficients associated with the third type of information pieces are from the Galois Field. The rich piece is full of information and is encoded by multiplying all the pieces in the generation by coefficients drawn randomly from GF(q) such that the encoded piece is given by (e1A+e2B+e3C+ . . . +esZ).

After encoding each of the information pieces, the processing circuitry 102 distributes the encoded information pieces to the plurality of nodes (104, 106, 108) on the computer network. In an embodiment, the processing circuitry 102 is configured to forward the encoded information pieces to a dedicated receiver. In the present system 100, when the sender is requested by the receiver, the sender may be configured to send two information pieces: the decodable piece, and the rich piece.

When the receiver receives the encoded content from the processing circuitry 102, the receiver may be configured to decode the encoded content to generate the original content. The decodable pieces (second type of information) are instantly and self-decodable, they may be back substituted to expedite the decoding of rich pieces (third type of information).

The decodable piece may be decoded immediately, and the rich piece is configured to be buffered. During the decoding, each of the second type of information pieces is decoded based on one of the first type of information pieces. Further, each of the third type of information pieces is decoded after all the information pieces of the content are received. Therefore, after receiving all the generation pieces, 50% thereof are decoded and back substituted. Consequently, rather than solving a '2s by 2s' matrix, the present system 100 solves a 's by s' matrix using Gaussian elimination. By implementing the Gaussian elimination method, the present system 100 maintains the computational complexity of decoding almost as in the conventional generation network coding, and increases the diversity of the pieces such that it is as close as possible to the case of the dense coding.

In an aspect of the present disclosure, in the present system 100 a first node (104) of the plurality of nodes (104, 106, 108) sends multiple requests to a second node (106) of the plurality of nodes (104, 106, 108) for requesting the content from the second node. On receiving such multiple requests from the first node (104), the second node (106) may be configured to transmit/communicate the encoded content towards the first node (104). The first node (104) receives one of the second type of information pieces (decodable piece) and one of the third type of information pieces (rich piece) from the second node (106) in response to each of the multiple requests.

In an embodiment, one of the plurality of nodes (104, 106, 108) is configured to send a different number to each of a subset of the plurality of nodes (104, 106, 108) for requesting the content from the subset of the plurality of nodes (104, 106, 108). In response, the one of the plurality of nodes is configured to receive a different subset of the information pieces from each of the subset of the plurality of nodes (104, 106, 108) based on the different number sent to the respective one of the subset of the plurality of nodes (104, 106, 108).

Once a receiver peer establishes connections to m seeders, the receiver peer sends a unique number, i, to each seeder where 0≤i<m. As the number i is received at the seeder side, the seeder firstly sends the (i mod m) piece, then for the subsequent transmissions, and without any coordination or feedback, the seeder sends pieces that are congruent to (i mod m), namely, i+m≡i+2m≡i+3m≡ . . . ≡(i mod m).

Example: Assuming four (4) seeders are to share sixteen (16) decodable pieces to a receiver peer. Then the corresponding pieces for each seeder are:
M1={0, 4, 8, 12},
M2={1, 5, 9, 13},
M3={2, 6, 10, 14}, and
M4={3, 7, 11, 15}.

The receiver updates and sends feedback when a seeder peer leaves, changes, or joins the P2P network.

In an embodiment, each of the different numbers sent to the subset of the plurality of nodes is less than a total number of the subset of the plurality of nodes.

In the system 100, if the generation size is "w" and the coefficients are drawn from the Galois Field such as GF ($2^8$), then the coefficients overhead per generation for a normal network coding is $w^2$ bytes. As the generation size of SGNC is twice that for the normal generation, then the coefficients overhead for SGNC is supposed to be four times that of the normal generation, notably, $4w^2$. However, because the coefficients values for the majority of decodable pieces are equal to 1, the coefficients overhead of SGNC can be minimized by using a technique in which a vector of 0 and 1 bits is sent, where a 0 bit indicates a coefficient value of one, while a 1 bit indicates the coefficient value is greater than one. This technique avoids sending a byte coefficient for a coefficient whose value is equal to one. In addition, coefficients whose values are greater than one is sent as bytes coefficients, as in the conventional case. Therefore, the coefficients overhead for SGNC caused by the rich pieces is equal to $2w^2$ bytes, whereas the overhead needed by the unity and decodable pieces is equal to (w−1) bytes+$w^2$ bits. Hence, the overall SGNC coefficients overhead per generation in bytes can be written as:

$$2w^2+w^2/8+w-1$$

It is evident from the above equation that the overhead is upper bounded by $O(w^2)$. Since the number of generations in SGNC is half the number of generations in the normal network coding, the overall coefficients overhead of SGNC is only slightly larger than the normal network coding overhead.

Figure 3:
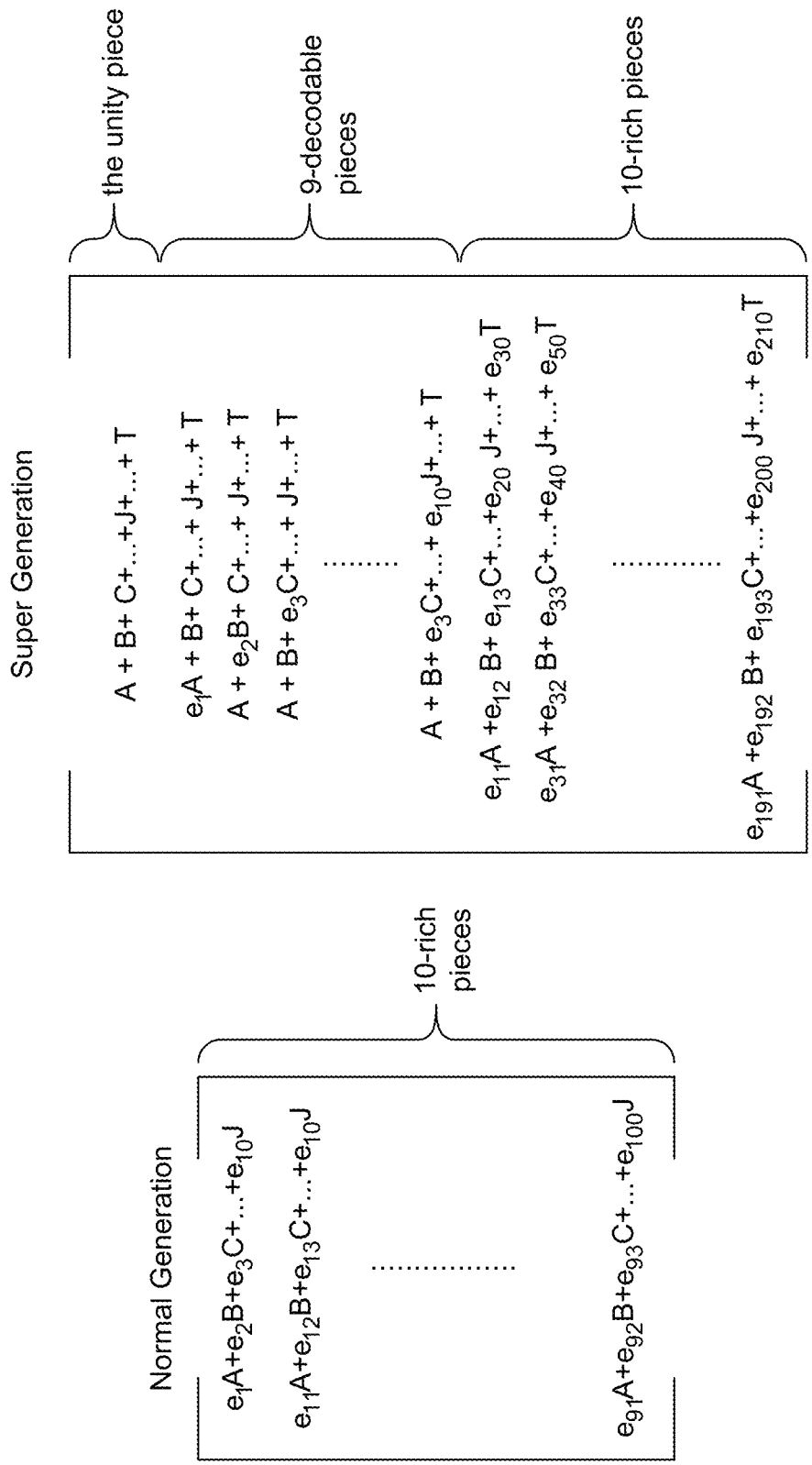
FIG. 3 illustrates a comparison between normal generation vs. information piece used in the present system, according to certain embodiments.

FIG. 3 illustrates a comparison of information pieces between the normal generation and the super generation used in the present system 100, according to certain embodiments.

FIG. 3 shows the normal generation with 10 pieces and the super generation with 20 pieces. In an embodiment, the super generation includes one unity piece, 9 decodable pieces, and 10 rich pieces. Although the size of the super generation is doubled to the normal generation, the decoding time is almost the same. FIG. 3 also shows that SGNC as employed in the present system 100 incurs additional coefficients overhead. The SGNC overhead in terms of coefficients is discussed in the further section.

Figure 4:
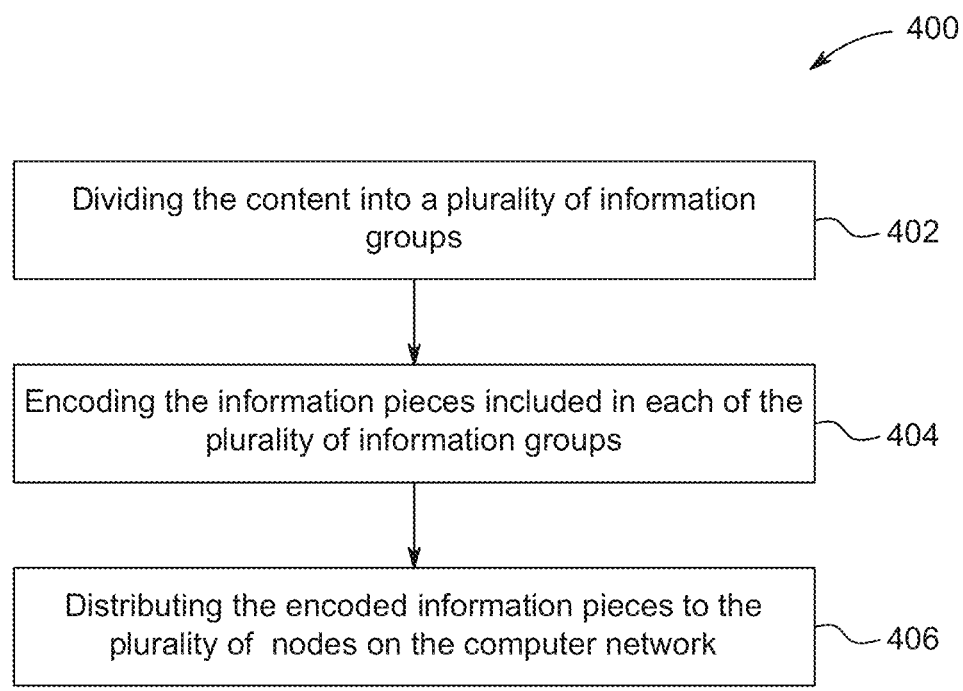
FIG. 4 illustrates a process flow for distributing content to a plurality of nodes on a computer network, according to certain embodiments.

FIG. 4 illustrates a process flow 400 for distributing content to a plurality of nodes such as the nodes (104, 106, 108) on a computer network, according to certain embodiments.

Step 402 includes dividing the content into a plurality of information groups. According to an aspect of the present disclosure, a processing circuitry such as the processing circuitry 102 may be configured to divide the content into the plurality of information groups. In an embodiment, each of the information groups includes a mutually exclusive subset of information pieces of the content.

Step 404 includes encoding the information pieces included in each of the plurality of information groups. The processing circuitry 102 may be configured to encode each of the information pieces based on a combination of the information pieces included in the respective information group and a plurality of coefficients associated with the information pieces included in the respective information group.

Step 406 includes distributing the encoded information pieces to the plurality of nodes (104, 106, 108) on the computer network. In an embodiment, the processing circuitry 102 may be configured to encode each of the information pieces into one of three types of information pieces. In an embodiment, all the coefficients associated with a first type of the information pieces are one. In a further embodiment, a subset of the coefficients associated with a second type of information pieces is from a Galois Field and the remaining coefficients associated with the second type of information pieces are one. A number of the subset of the coefficients that is associated with the second type of information pieces and from the Galois Field is one. In a further embodiment, all the coefficients associated with a third type of information pieces are from the Galois Field.

In an embodiment, if a first node wants to receive any content from a second node, then the first node of the plurality of nodes (104, 106, 108) is configured to send a request demanding a specific content from the second node of the plurality of nodes (104, 106, 108). In an aspect of the present disclosure, the first node may be configured to send multiple requests to the second node. In response to each of the multiple requests sent by the first node, the second node sends one of the second type of information pieces and one of the third type of information pieces to the first node.

After receiving the second type of information piece from the second node, the first node is configured to decode the second type of information piece.

During the decoding of the second and third type of information pieces, each of the second type of information pieces is decoded based on one of the first type of information pieces. Further, each of the third type of information pieces is decoded after all the information pieces of the content are received. In an embodiment, the first node may be configured to store the third type of information piece.

In an embodiment, when one of the plurality of nodes (104, 106, 108) requests the content from a subset of the plurality of nodes, the one of the plurality of nodes may be configured to send a different number to each of the subset of the plurality of nodes. After receiving the different number from the one of the plurality of nodes, each of the subset of the plurality of nodes sends a different subset of the information pieces based on the different number sent to the respective one of the subset of the plurality of nodes. Each of the different numbers sent to the subset of the plurality of nodes is less than a total number of the subset of the plurality of nodes.

The present system 100 employs a transmission method that requires a minimal coordination among the peers. The transmission technique works as follows:

Once a receiver peer establishes connections to m seeders, the receiver peer sends a unique number, i, to each seeder where $0 \leq i < m$. As the number i is received at the seeder side, the seeder firstly sends the (i mod m) piece, then for the subsequent transmissions, and without any coordination or feedback, the seeder sends pieces that are congruent to (i mod m), namely, $i+m \equiv i+2m \equiv i+3m \equiv \ldots \equiv$ (i mod m).

Example: Assuming 4 seeders are to share 16 decodable pieces to a receiver peer. Then the corresponding pieces for each seeder are:

M1={0, 4, 8, 12},
M2={1, 5, 9, 13},
M3={2, 6, 10, 14}, and
M4={3, 7, 11, 15}.

The receiver updates and sends feedback when a seeder peer leaves, changes, or joins the P2P network.

The following examples are provided to illustrate further and to facilitate the understanding of the present disclosure.

Experimental Data and Analysis

In the following experiments, a P2P network is divided into multiple swarms with each swarm containing a maximum of 8 nodes. Each node can connect to at most 4 other nodes selected at random from the same swarm or nearby swarms. In addition, it is assumed that all the peers have same data rate and therefore the download time can now be measured in terms of number of rounds. SGNC is compared with the optimal theoretical solution, normal generations network coding (NGNC), overlapped generations network coding (OGNC), Fulcrum network coding (FNC), and the baseline BitTorrent system. For some experiments, only NGNC is considered, while OGNC and/or FNC are omitted since they behave mostly as NGNC.

In the experiments, files of sizes equal to 320 MB, 640 MB, 1.2 GB, and 5.1 GB are shared. Each file is divided into generations based on #Generations_NGNC and #Generations_SGNC for NGNC and SGNC, respectively, wherein $$\#Generations\_NGNC = \frac{FileSize}{BestGenerationSize}$$

and $$\#Generations\_SGNC = \frac{FileSize}{BestGenerationSize * 2}.$$

For example, if the best generation size is chosen as 40 MB, then the 320 MB file is divided into 8 generations for NGNC and 4 for SGNC.

In the experiments, coefficients are drawn randomly from GF(256) and it is assumed that all pieces are innovative. Therefore, there is no linear dependency among the coefficients of encoded pieces.

The evaluation considers the following performance metrics: content availability as a measure to robustness to churn, overhead rate caused by duplicated pieces, download time, decodability rate, and the network coding coefficients overhead percentage. For each of the above metrics, the following three scheduling policies are considered 1) Random: assumes zero coordination among all the peers.
2) Local rarest-first: coordination among the peers is restricted to the peers within the same swarm.
3) Global rarest-first: global coordination among the peers in the entire network is assumed.

For network coding schemes, the RF-policies are applied at generations level rather than at the pieces level. The following subsections detail the results obtained for each of the considered metrics.

Experiment 1: Content Availability

Figure 5A:
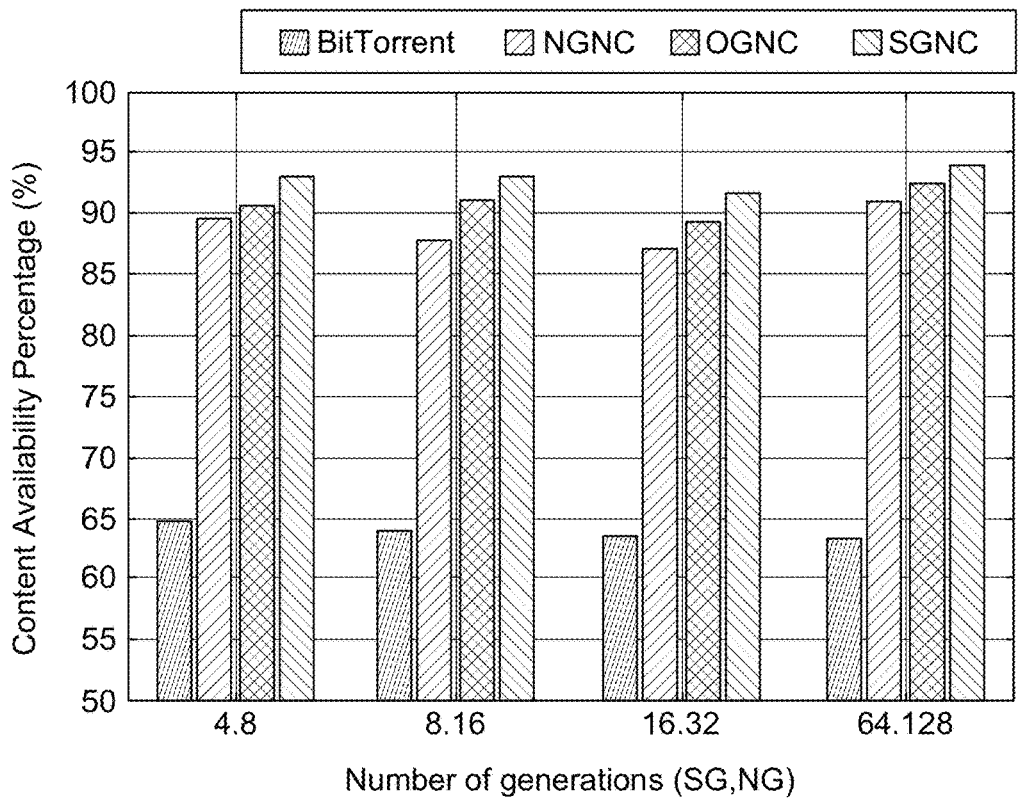
FIG. 5A illustrates a graph showing content availability based on random policy, according to certain embodiments.
Figure 5B:
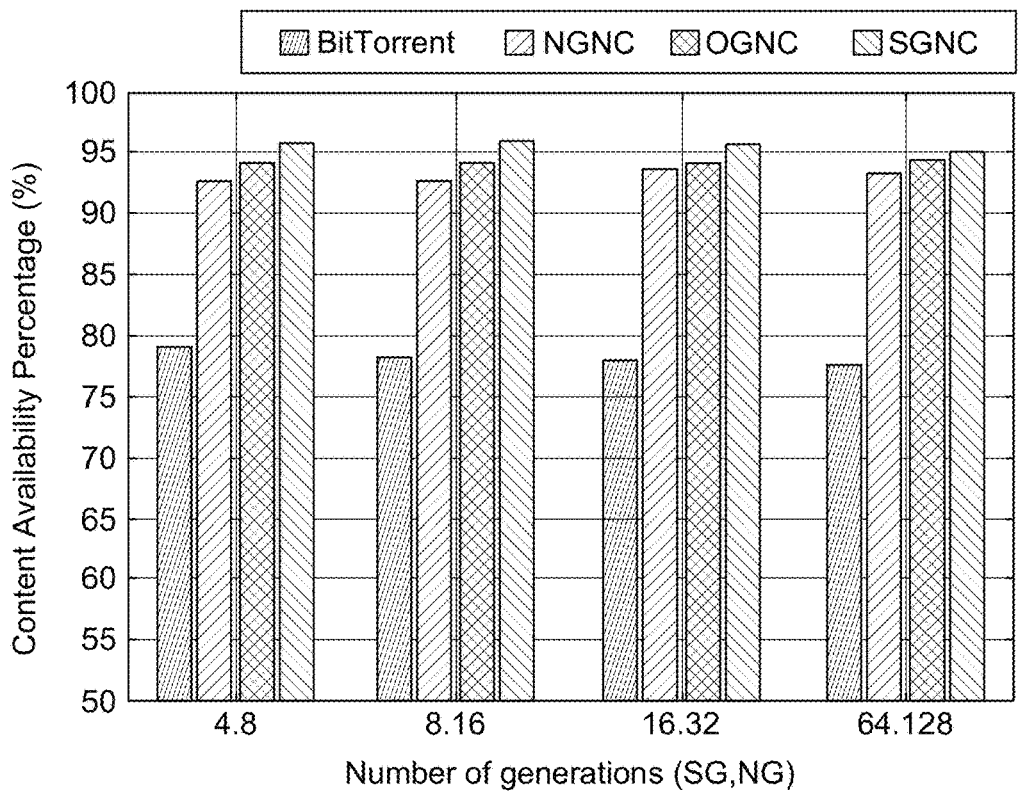
FIG. 5B illustrates a graph showing content availability based on Local rarest-first policy, according to certain embodiments.
Figure 5C:
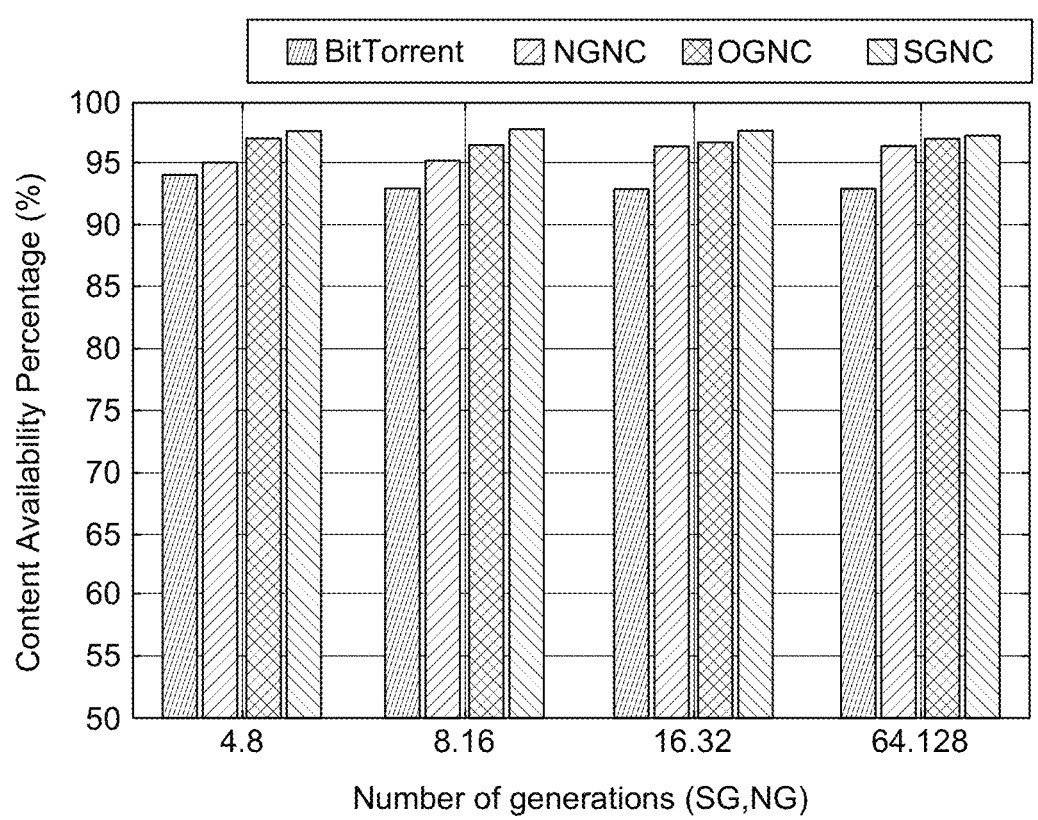
FIG. 5C illustrates a graph showing content availability based on Global rarest-first policy, according to certain embodiments.

FIG. 5A, FIG. 5B, and FIG. 5C illustrate a set of graphs showing content availability based on different scheduling policies, according to certain embodiments.

FIG. 5A shows the content availability based on a random scheduling policy, FIG. 5B shows the content availability based on a local rarest-first policy, and FIG. 5C shows the content availability according to a global rarest-first policy. In this experiment, the assumption was taken that the seeder or seeders leave the network after they share a number of pieces that are equal to the file pieces. The remaining peers cooperate to complete the file download from each other.

From FIG. 5A-5C, it is evident that the content availability for SGNC over NGNC and OGNC is improved by at least 2% and 1%, respectively. For baseline BitTorrent, the content availability improves significantly when the RF-policy (rarest-first) is applied, while the improvement provided by the RF-policy is modest when the network coding is employed. This is a direct result of the fact that the network coding does not require global topology information and can handle high churn in the network.

Experiment 2: Redundancy Overhead Percentage

Figure 6A:
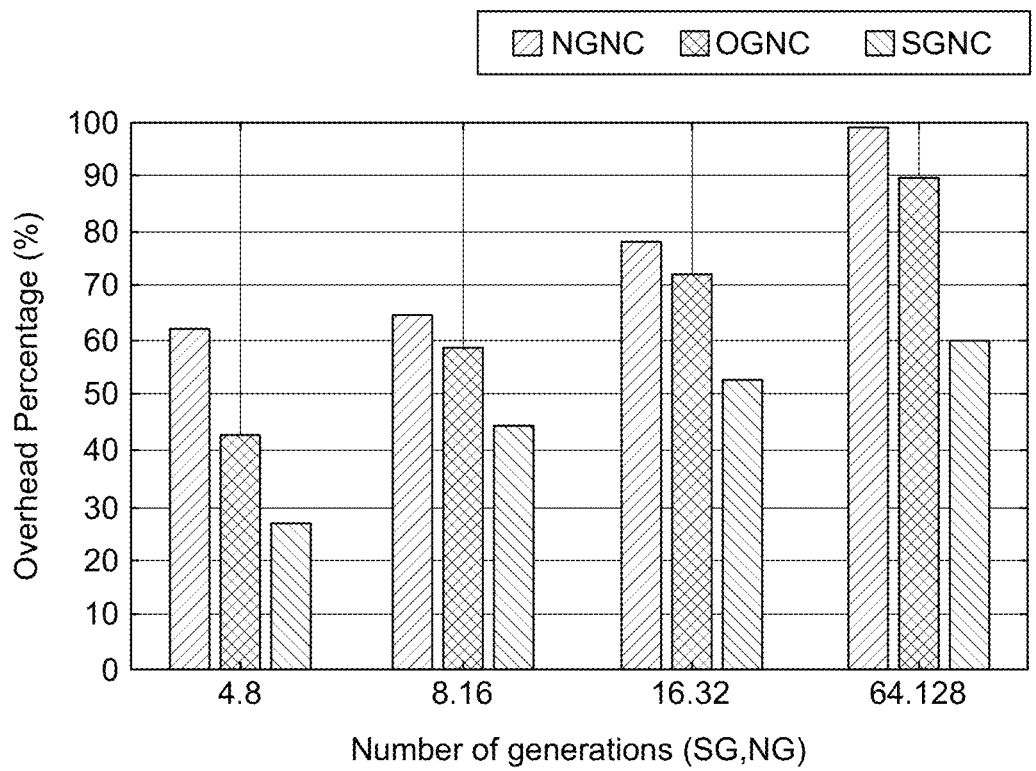
FIG. 6A illustrates a graph showing redundancy overhead percentage based on random policy, according to certain embodiments.
Figure 6B:
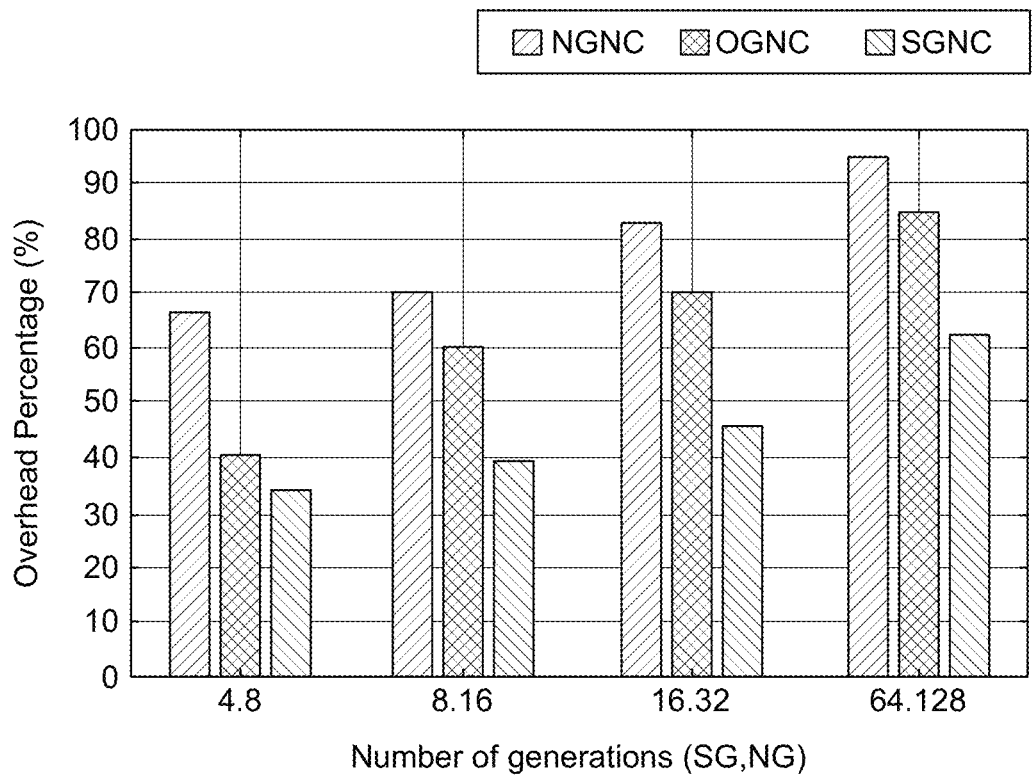
FIG. 6B illustrates a graph showing redundancy overhead percentage based on Local rarest-first policy, according to certain embodiments.
Figure 6C:
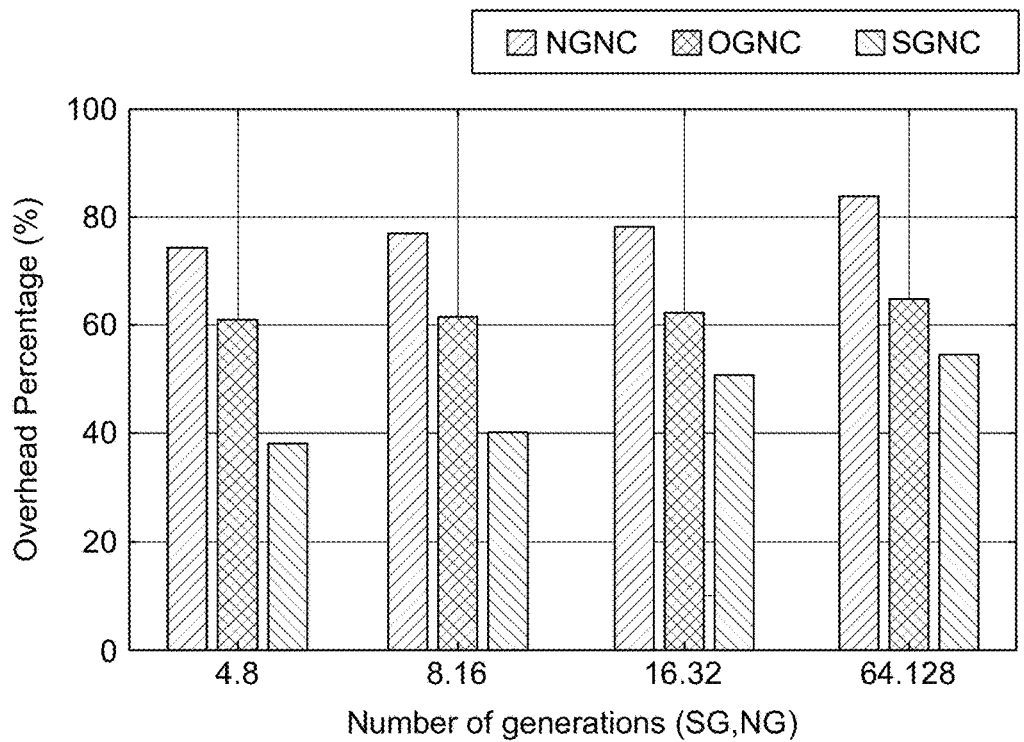
FIG. 6C illustrates a graph showing redundancy overhead percentage based on Global rarest-first, according to certain embodiments.

FIG. 6A-6C illustrate a set of graphs showing redundancy overhead percentage based on different scheduling policies, according to certain embodiments of the present disclosure.

Figure 6D:
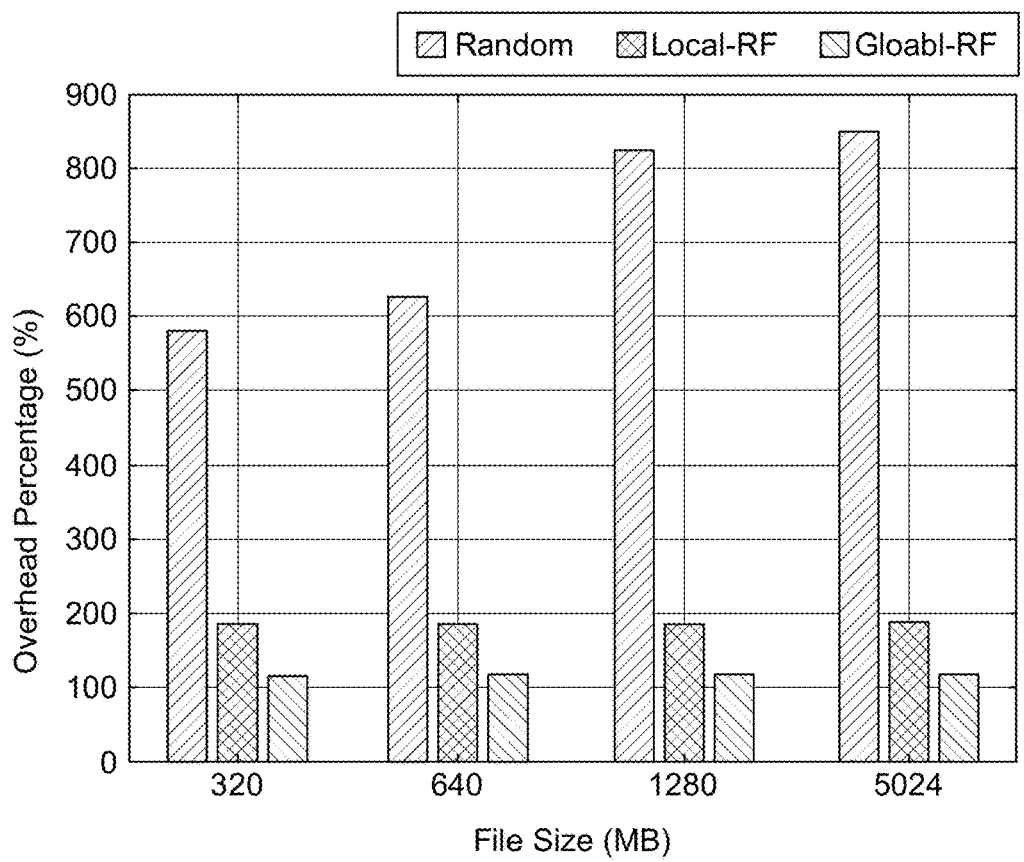
FIG. 6D illustrates a graph showing redundancy overhead percentage based on different scheduling policies, according to certain embodiments.

While performing this experiment, seeders continue to send pieces, based on the designated scheduling policy, to a peer until the peer completes the download. As a result, duplicated pieces may be received. For network coding schemes, the duplicate piece is considered as an overhead if it is received after all the corresponding generation pieces are complete. Further, it is assumed that when the RF-policy is applied, the coordination is done only among the seeders and the receiver peer does not send any feedback. FIG. 6A, FIG. 6B, and FIG. 6C show results of the overhead based on the random, the local, and the global rarest-first scheduling policies, respectively. The figures show clearly that the random scheduling policy must be avoided as it incurs the largest overhead percentage relative to the other two scheduling policies. It can also be noticed that SGNC always incurs the lowest overhead for all the scheduling policies relative to the other schemes. The results, across the considered number of generations, also show that SGNC has about half or quarter of the overhead relative to NGNC for the local and global RF policies, respectively. The comparative overhead results for baseline BitTorrent are omitted from FIGS. 6A-6C since it is very high and exceeds 100% for all file sizes relative to NGNC, OGNC, and SGNC. FIG. 6D shows that distributing a file to the baseline BitTorrent incurs extreme overhead even when using local and global scheduling policies.

Experiment 3: Download Time

FIGS. 7A-7D illustrate a set of graphs showing download times for different scheduling policies, according to certain embodiments.

Assuming the number of pieces shared during each round k is the same, then the optimal or theoretical download time is given by:

OptimalDownloadTime=FileSize/k.

Accordingly, the download time experiment assumes a peer receives pieces of the file from other peers, such that each peer sends 1 MB per round, until the peer completes the download. FIG. 7A, FIG. 7B, FIG. 7C, and FIG. 7D depict the download times for file sizes 320 MB, 640 MB, 1.2 GB, and 5.1 GB, respectively. The results show that for all scheduling policies and all the considered file sizes, SGNC always achieves the closest download time to the optimal case. Indeed, SGNC can download the file faster than NGNC by at least 10%. As the number of generations increases, the improvement also increases.

Experiment 4: Decodability Rate

Figure 8A:
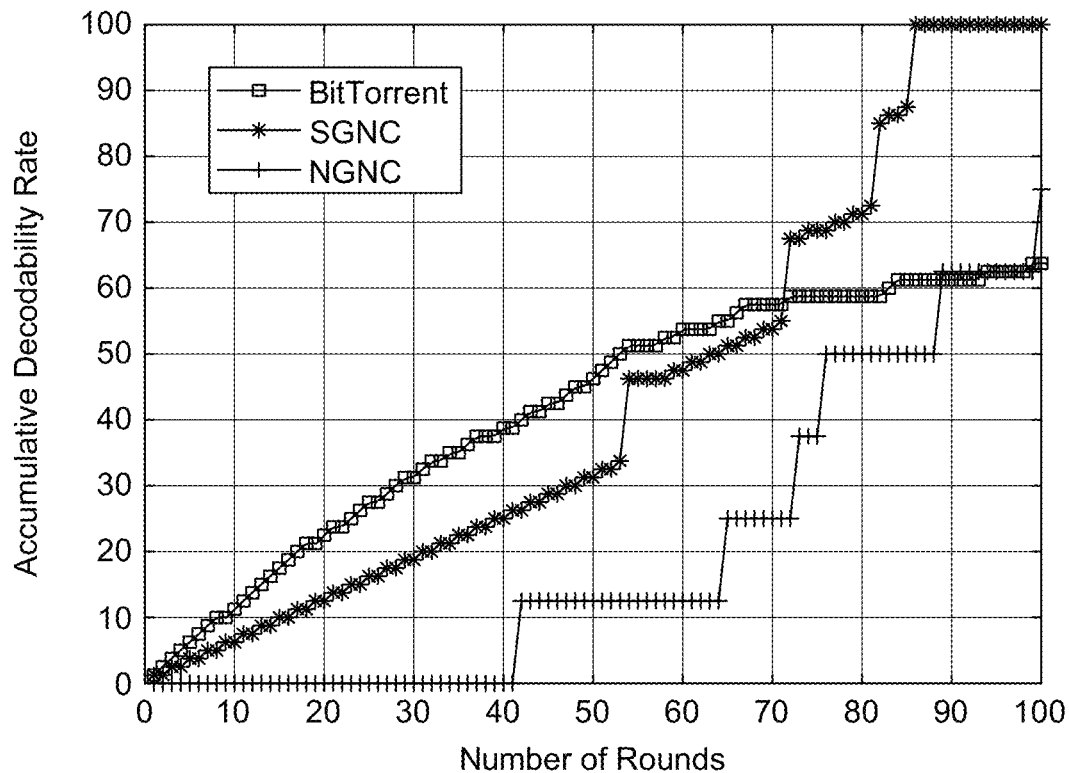
FIG. 8A illustrates a graph showing decodability of BitTorrent and different network coding schemes based on random scheduling policy, according to certain embodiments.
Figure 8B:
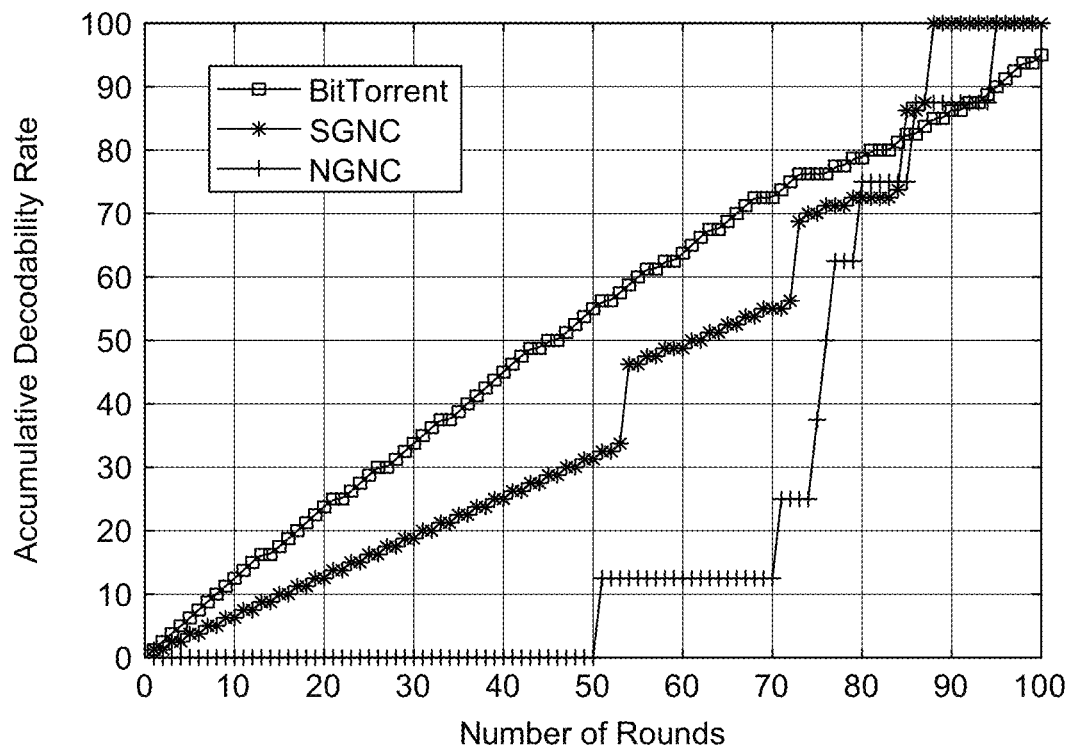
FIG. 8B illustrates a graph showing decodability of BitTorrent and different network coding schemes based on local rarest-first scheduling policy, according to certain embodiments.
Figure 8C:
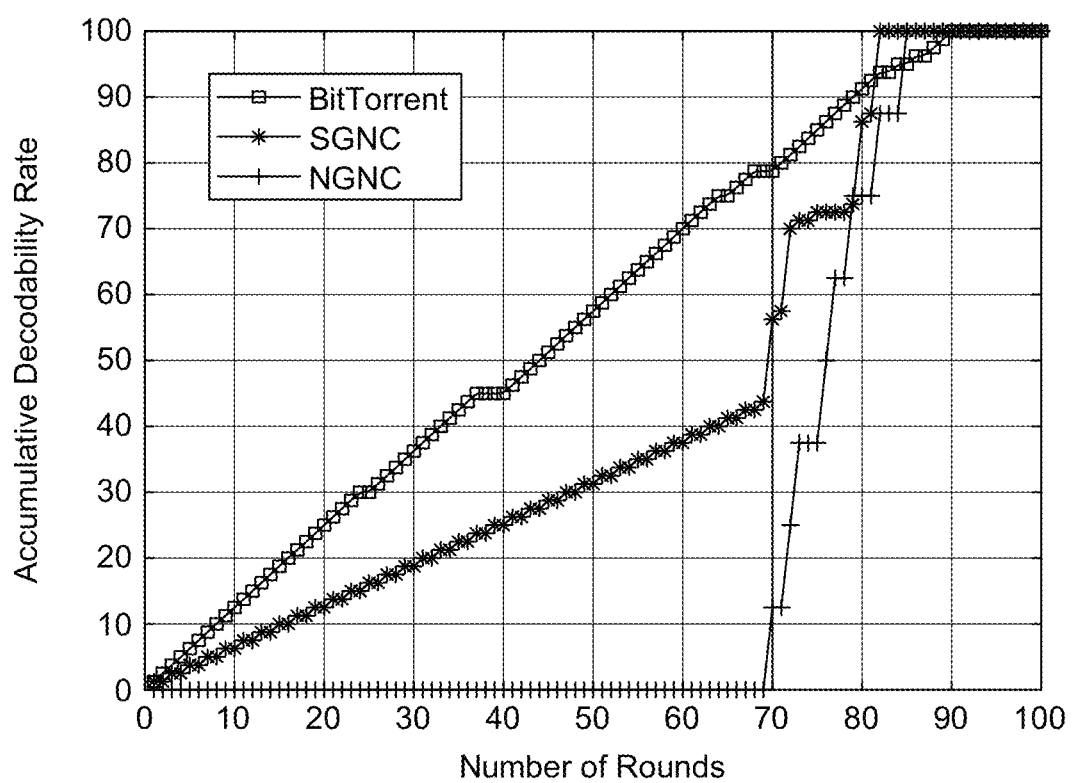
FIG. 8C illustrates a graph showing decodability of BitTorrent and different network coding schemes based on global rarest-first scheduling policy, according to certain embodiments.
Figure 9A:
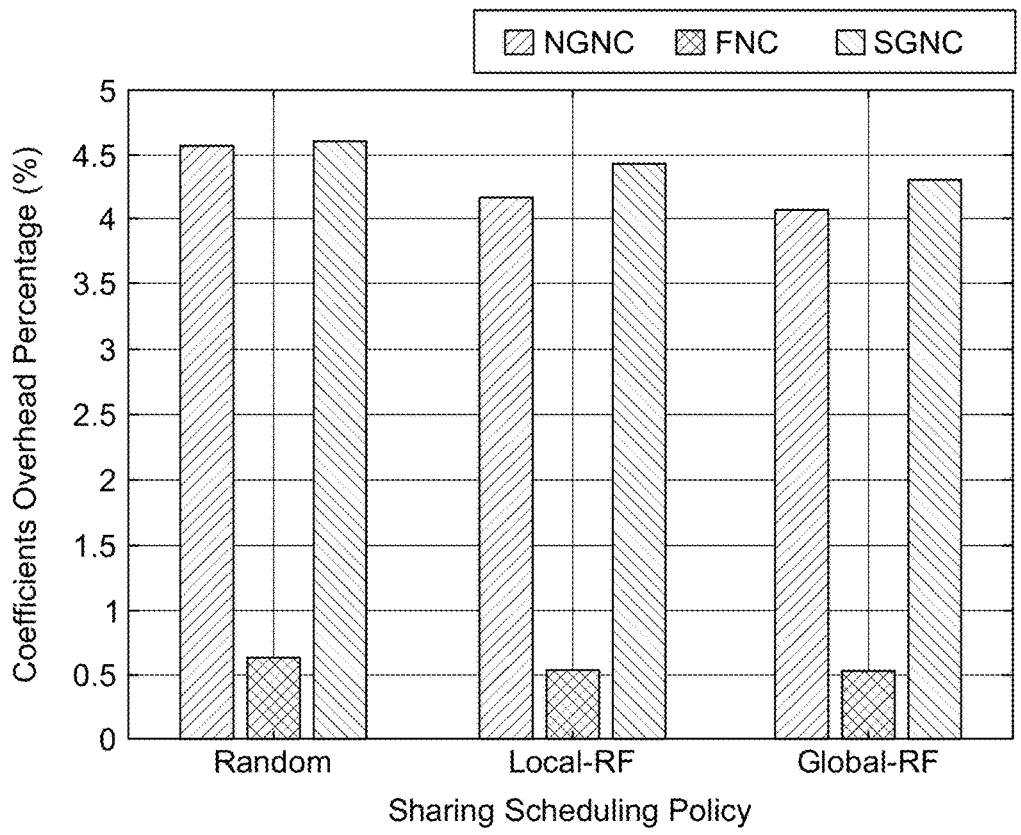
FIG. 9A illustrates a graph showing network coding coefficients overhead percentage of 320 MB file, according to certain embodiments.
Figure 9B:
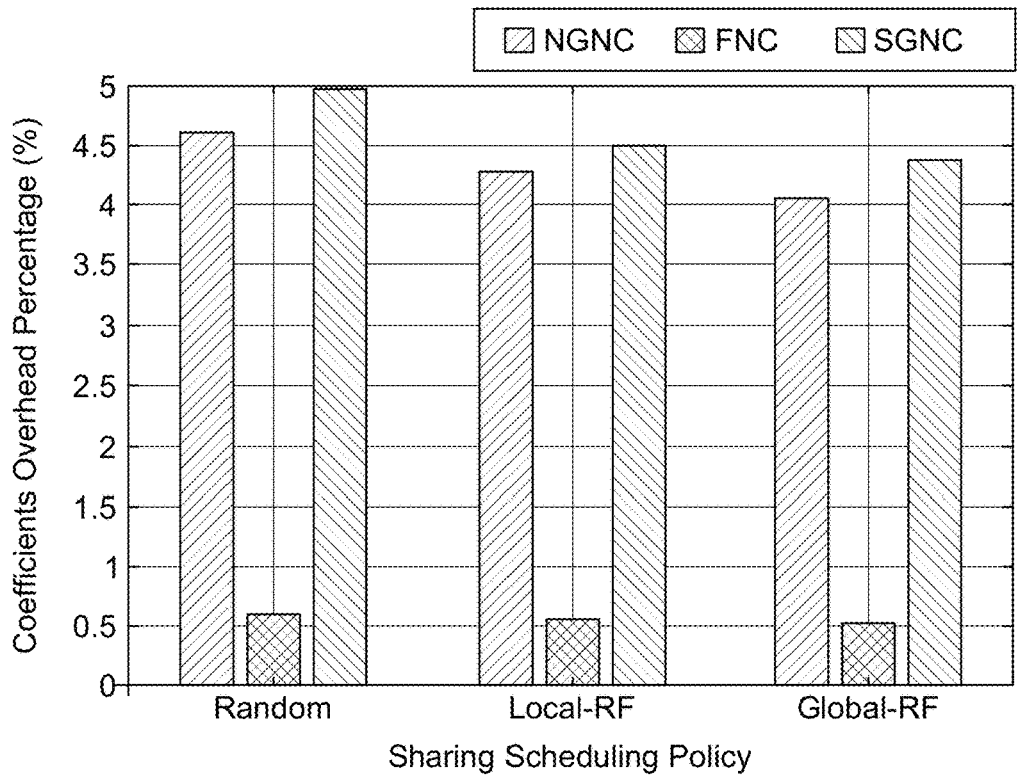
FIG. 9B illustrates a graph showing network coding coefficients overhead percentage of 640 MB file, according to certain embodiments.
Figure 9C:
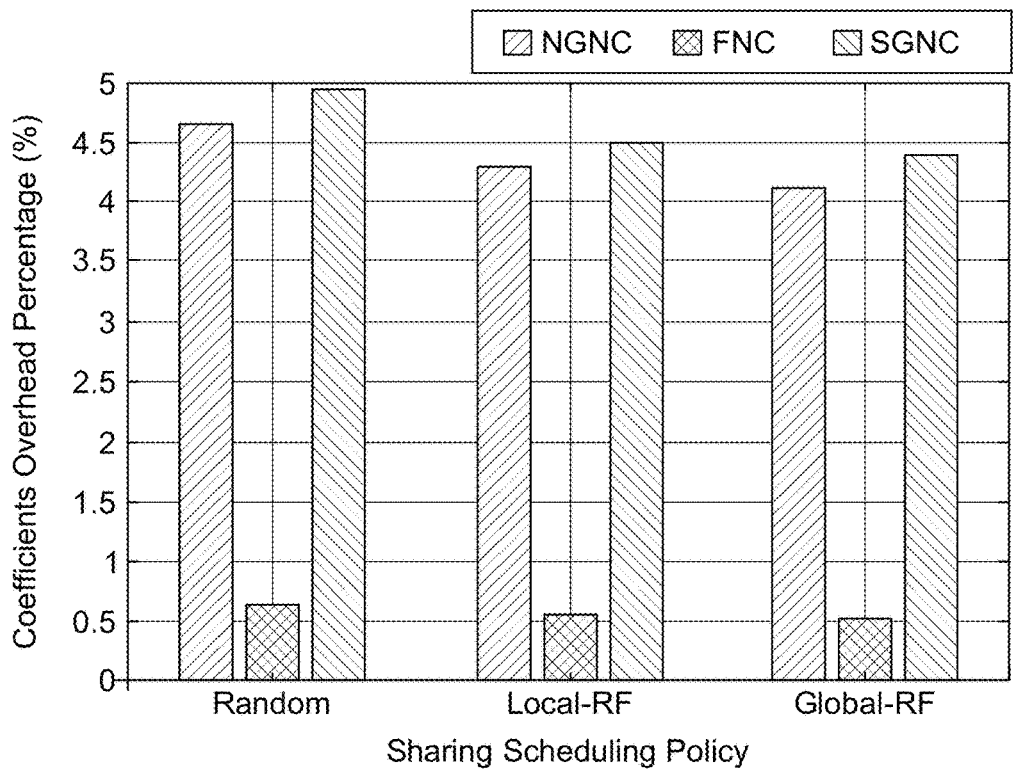
FIG. 9C illustrates a graph showing network coding coefficients overhead percentage of 1.2 GB file, according to certain embodiments.
Figure 9D:
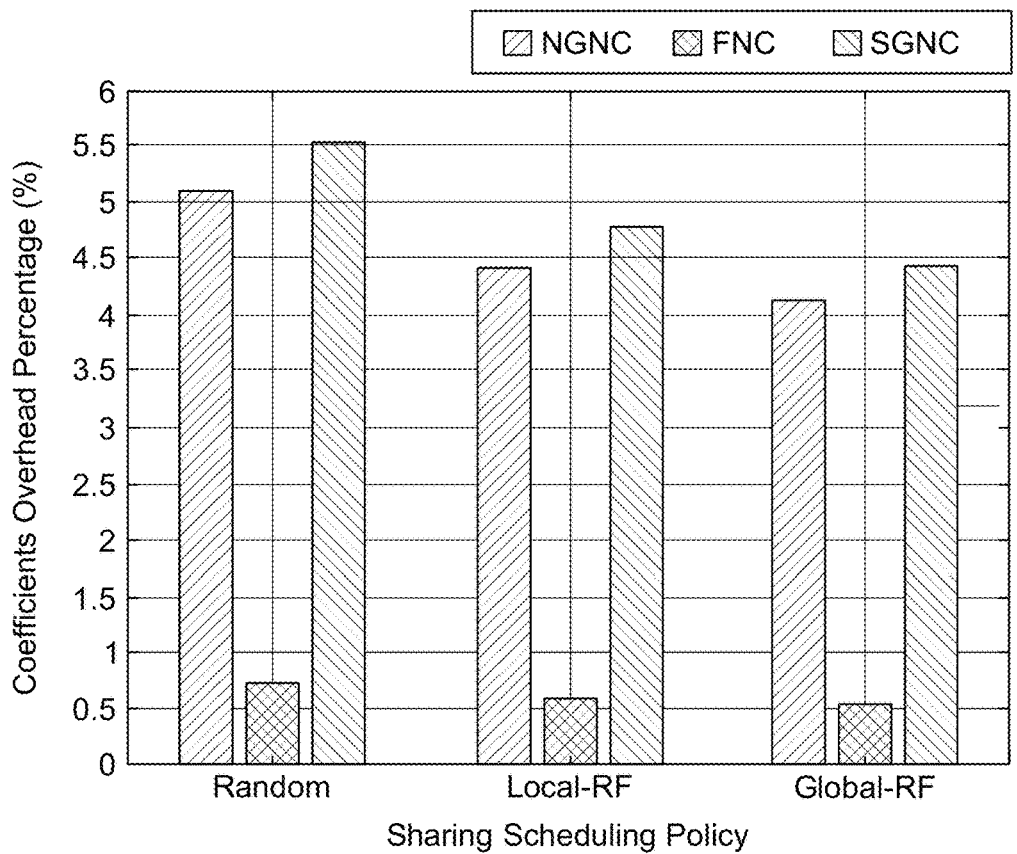
FIG. 9D illustrates a graph showing network coding coefficients overhead percentage of GB file, according to certain embodiments.

FIGS. 8A-8C illustrate a set of graphs showing decodability rates of BitTorrent and different network coding schemes based on different scheduling policies, according to certain embodiments.

Figure 7A:
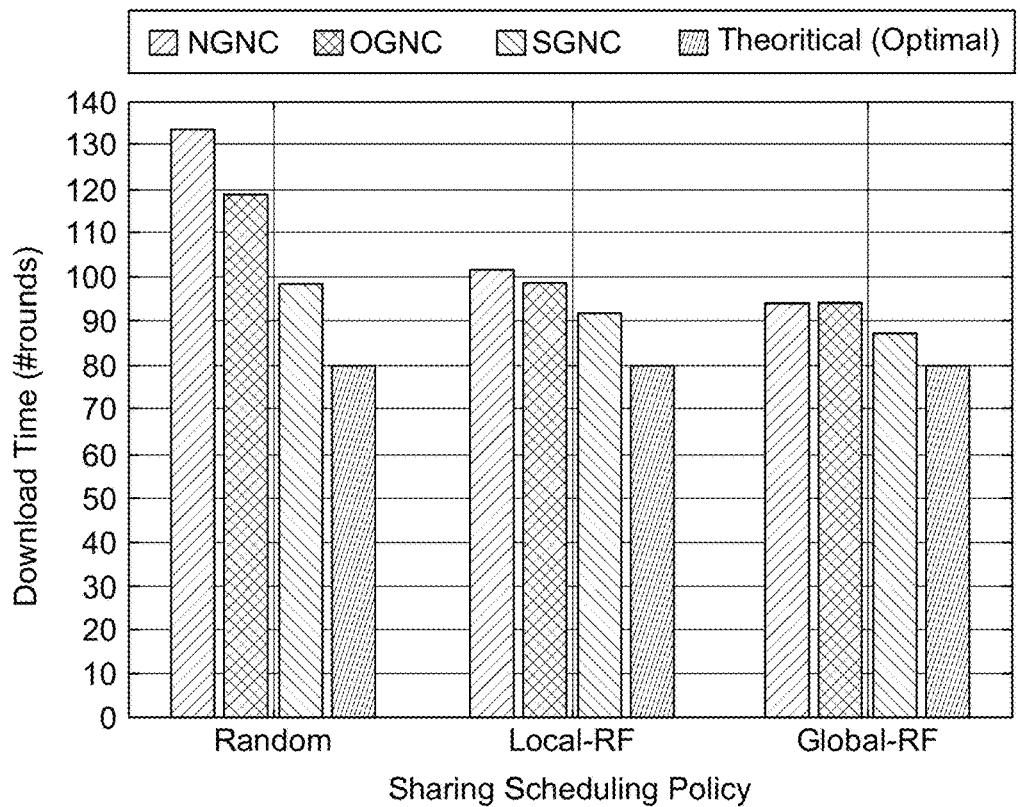
FIG. 7A illustrates a graph showing download time of 320 MB file for different scheduling policies, according to certain embodiments.
Figure 7B:
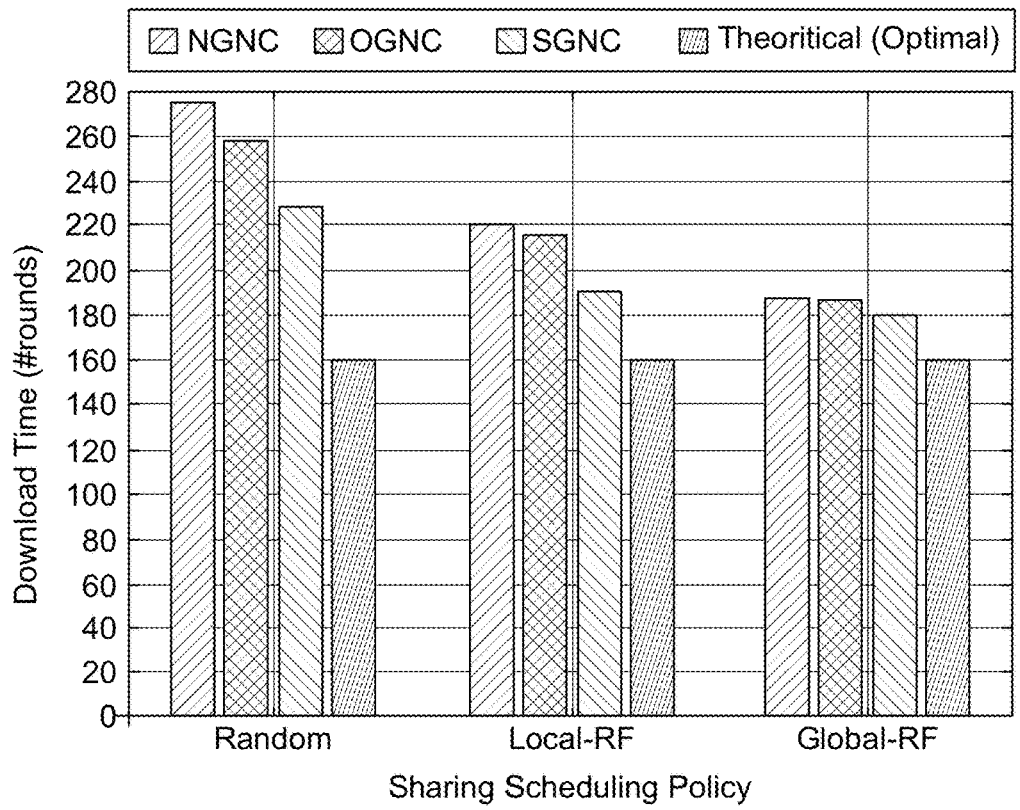
FIG. 7B illustrates a graph showing download time of 640 file for different scheduling policies, according to certain embodiments.
Figure 7C:
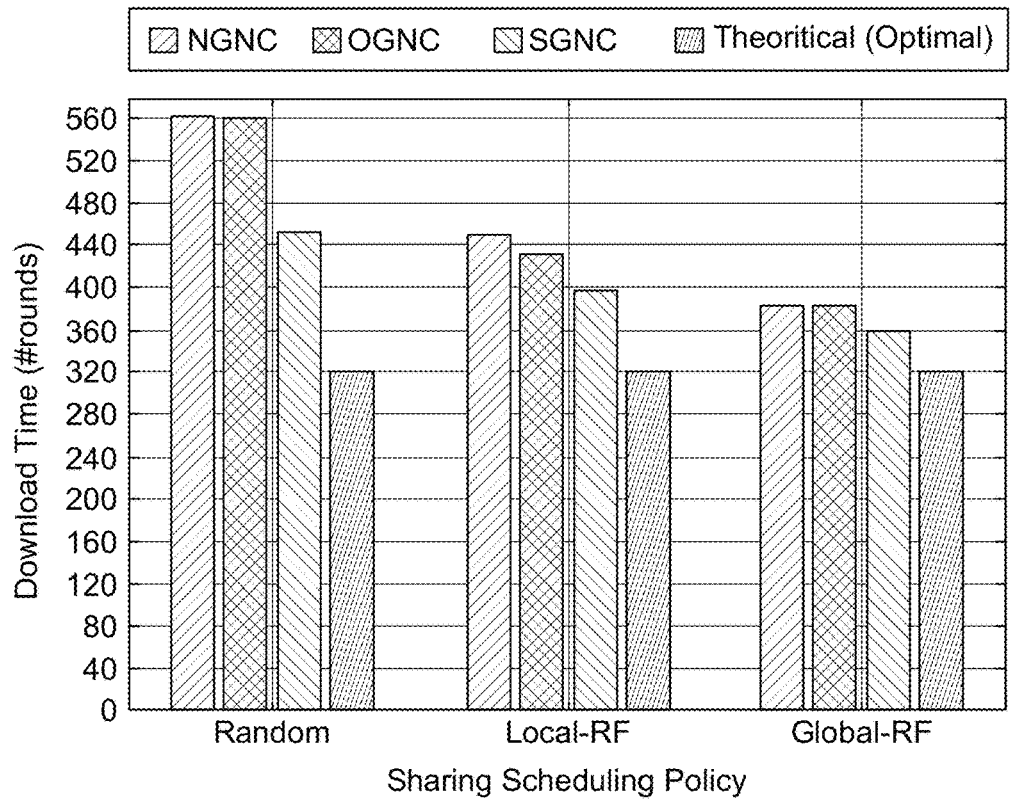
FIG. 7C illustrates a graph showing download time of 1.2 GB file for different scheduling policies, according to certain embodiments.
Figure 7D:
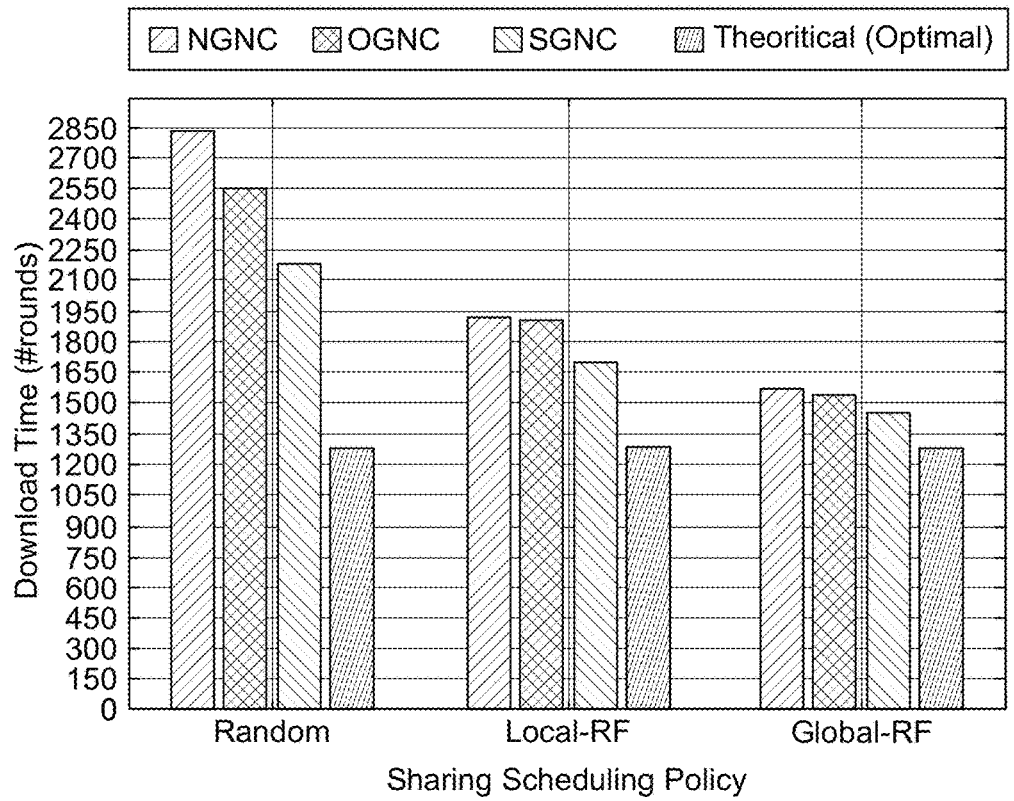
FIG. 7D illustrate a set of graphs showing download time of 5.1 GB file for different scheduling policies, according to certain embodiments.

Decodability rate is referred to a cumulative number of already decoded pieces from the instant of receiving the first piece to a certain point of time. Higher decodability number leads to higher diversity in pieces and less CPU (central processing unit) load. As such, the decodability rate of a file with eighty (80) pieces is measured from round 0 to round 100 in this experiment. In general, the conventional network coding suffers from low decodability rate especially (as shown in FIG. 7D). FIG. 8A shows the decodability rates of BitTorrent and different network coding schemes based on the random scheduling policy. at the initial rounds. FIG. 8A presents that the normal generations network coding cannot decode any piece until round 42. On the other hand, the baseline BitTorrent can decode almost one piece every round. FIG. 8A also shows that SGNC can start decoding from very early rounds at least at the rate of one piece for every two rounds. This superior performance of SGNC is the result of the self-decodable pieces. This supports the diversity and availability of the pieces, and balances the CPU load by distributing the required load smoothly over all rounds. FIG. 8B and FIG. 8C consider the same experiment but for the other two scheduling policies: the local and global rarest-first, respectively.

Experiment 5: Network Coding Coefficients Overhead Percentage

FIG. 9A-9D illustrate a set of graphs showing network coding coefficients overhead percentages in various size of data, according to certain embodiments. Since the coefficients for all the experiments are taken from GF ($2^8$), then the coefficients overhead for a generation size w is $w^2$ bytes for NGNC, $w^2+w$ bits for FNC, and $2w^2+w^2/8+w-1$ for SGNC. In this experiment after a peer completes the download of a file, the network coding coefficients overhead caused by the downloaded file and the redundant pieces is calculated. Results corresponding to the file sizes of 320 MB, 640 MB, 1.2 GB, and 5.1 GB are depicted in FIG. 9A, FIG. 9B, FIG. 9C, and FIG. 9D, respectively.

The results show the following:
1) the network coding coefficients overhead does not exceed 6% for all the network coding schemes, file sizes, and sharing scheduling policies,
2) FNC incurs the minimum coefficients overhead with at most 0.5%, and
3) coefficients overhead incurred by SGNC is roughly equal to that of NGNC.

Experiment 6: Overall Overhead

Figure 10:
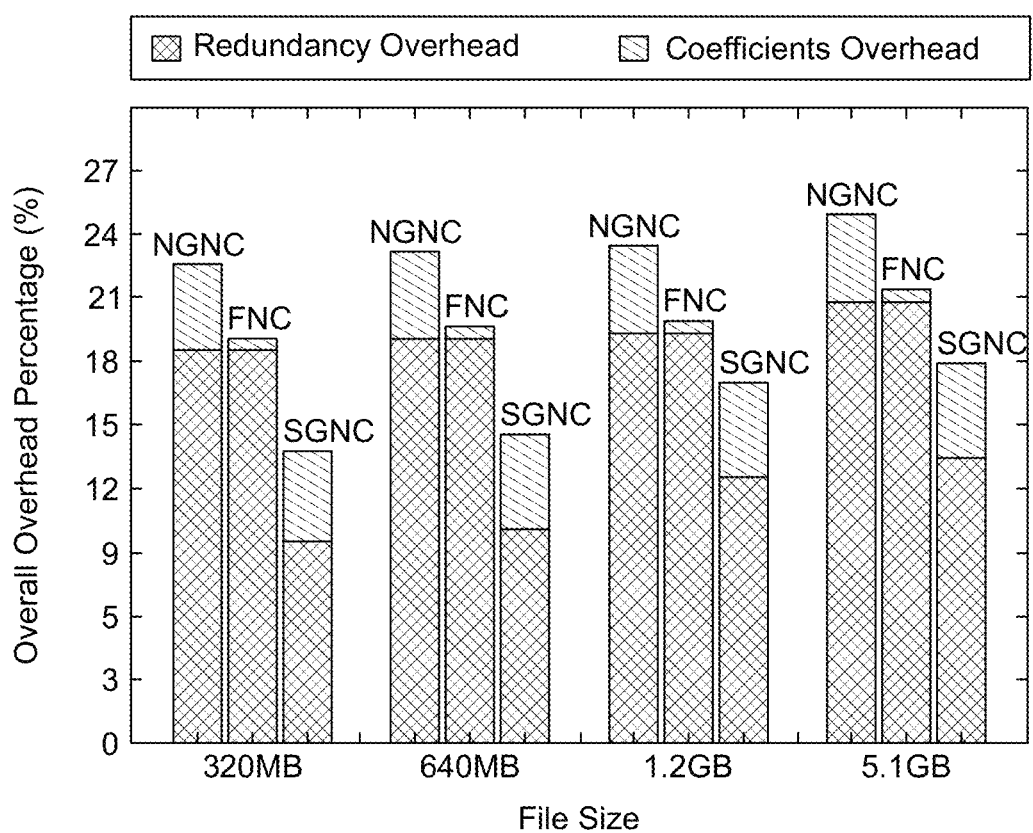
FIG. 10 illustrates a graph showing overall overhead based on global-rarest first scheduling policy, according to certain embodiments.

FIG. 10 illustrates a graph showing overall overheads based on the global-rarest first scheduling policy, according to certain embodiments.

While the present system 100 has the maximum coefficients overhead, however, if considering the overall overhead which is the cumulative overhead caused by network coding coefficients and the duplicate pieces at the receiver side, then SGNC incurs the minimum overall overhead. FIG. 10 shows the results of the overall overheads for NGN, FNC, and SGNC for different file sizes based on the global rarest-first scheduling policy. It is clear that SGNC has the lowest overhead among all network coding schemes.

The first embodiment is illustrated with respect to FIGS. 1-14. The first embodiment describes a method 400 of distributing content to a plurality of nodes on a computer network. The method 400 includes dividing the content into a plurality of information groups wherein each of the information groups including a mutually exclusive subset of information pieces of the content, encoding the information pieces included in each of the plurality of information groups based on a combination of the information pieces included in the respective information group and a plurality of coefficients associated with the information pieces included in the respective information group, distributing the encoded information pieces to the plurality of nodes on the computer network, wherein each of the information pieces is encoded into one of three types of information pieces, all the coefficients associated with a first type of the three types of information pieces are one, a subset of the coefficients associated with a second type of the three types of information pieces is from a Galois Field and the remaining coefficients associated with the second type of the three types of information pieces are one, and all the coefficients associated with a third type of the three types of information pieces are from the Galois Field. In an aspect of the present disclosure, a number of the subset of the coefficients that is associated with the second type of information pieces and from the Galois Field is one.

The second embodiment is illustrated with respect to FIGS. 1-14. The second embodiment describes a system 100 for distributing content to a plurality of nodes (104, 106, 108) on a computer network. The system 100 includes a processing circuitry 102 configured to divide the content into a plurality of information groups, each of the information groups including a mutually exclusive subset of information pieces of the content; encode the information pieces included in each of the plurality of information groups based on a combination of the information pieces included in the respective information group and a plurality of coefficients associated with the information pieces included in the respective information group; and distribute the encoded information pieces to the plurality of nodes on the computer network, wherein each of the information pieces is encoded into one of three types of information pieces, all the coefficients associated with a first type of the three types of information pieces are one, a subset of the coefficients associated with a second type of the three types of information pieces is from a Galois Field and the remaining coefficients associated with the second type of the three types of information pieces are one, and all the coefficients associated with a third type of the three types of information pieces are from the Galois Field.

A number of the subset of the coefficients that is associated with the second type of information pieces and from the Galois Field is one.

Each of the second type of information pieces is decoded based on one of the first type of information pieces.

Each of the third type of information pieces is decoded after all the information pieces of the content are received.

In an aspect of the present disclosure, a first node of the plurality of nodes sends multiple requests to a second node of the plurality of nodes for requesting the content from the second node, and receives one of the second type of information pieces and one of the third type of information pieces from the second node in response to each of the multiple requests.

According to an aspect of the present disclosure, one of the plurality of nodes sends a different number to each of a subset of the plurality of nodes for requesting the content from the subset of the plurality of nodes, and receives a different subset of the information pieces from each of the subset of the plurality of nodes based on the different number sent to the respective one of the subset of the plurality of nodes.

Each of the different numbers sent to the subset of the plurality of nodes is less than a total number of the subset of the plurality of nodes.

The third embodiment is illustrated with respect to FIGS. 1-14. The third embodiment describes a non-transitory computer readable medium storing instructions, which when executed by a processor, cause the processor to perform a method for distributing content to a plurality of nodes on a computer network. The method includes dividing the content into a plurality of information groups, each of the information groups including a mutually exclusive subset of information pieces of the content, encoding the information pieces included in each of the plurality of information groups based on a combination of the information pieces included in the respective information group and a plurality of coefficients associated with the information pieces included in the respective information group, and distributing the encoded information pieces to the plurality of nodes on the computer network, wherein each of the information pieces is encoded into one of three types of information pieces, all the coefficients associated with a first type of the three types of information pieces are one, a subset of the coefficients associated with a second type of the three types of information pieces is from a Galois Field and the remaining coefficients associated with the second type of the three types of information pieces are one, and all the coefficients associated with a third type of the three types of information pieces are from the Galois Field.

A number of the subset of the coefficients that is associated with the second type of information pieces and from the Galois Field is one.

Each of the second type of information pieces is decoded based on one of the first type of information pieces.

Each of the third type of information pieces is decoded after all the information pieces of the content are received.

A first node of the plurality of nodes sends multiple requests to a second node of the plurality of nodes for requesting the content from the second node, and receives one of the second type of information pieces and one of the third type of information pieces from the second node in response to each of the multiple requests.

One of the plurality of nodes sends a different number to each of a subset of the plurality of nodes for requesting the content from the subset of the plurality of nodes and receives a different subset of the information pieces from each of the subset of the plurality of nodes based on the different number sent to the respective one of the subset of the plurality of nodes.

Figure 11:
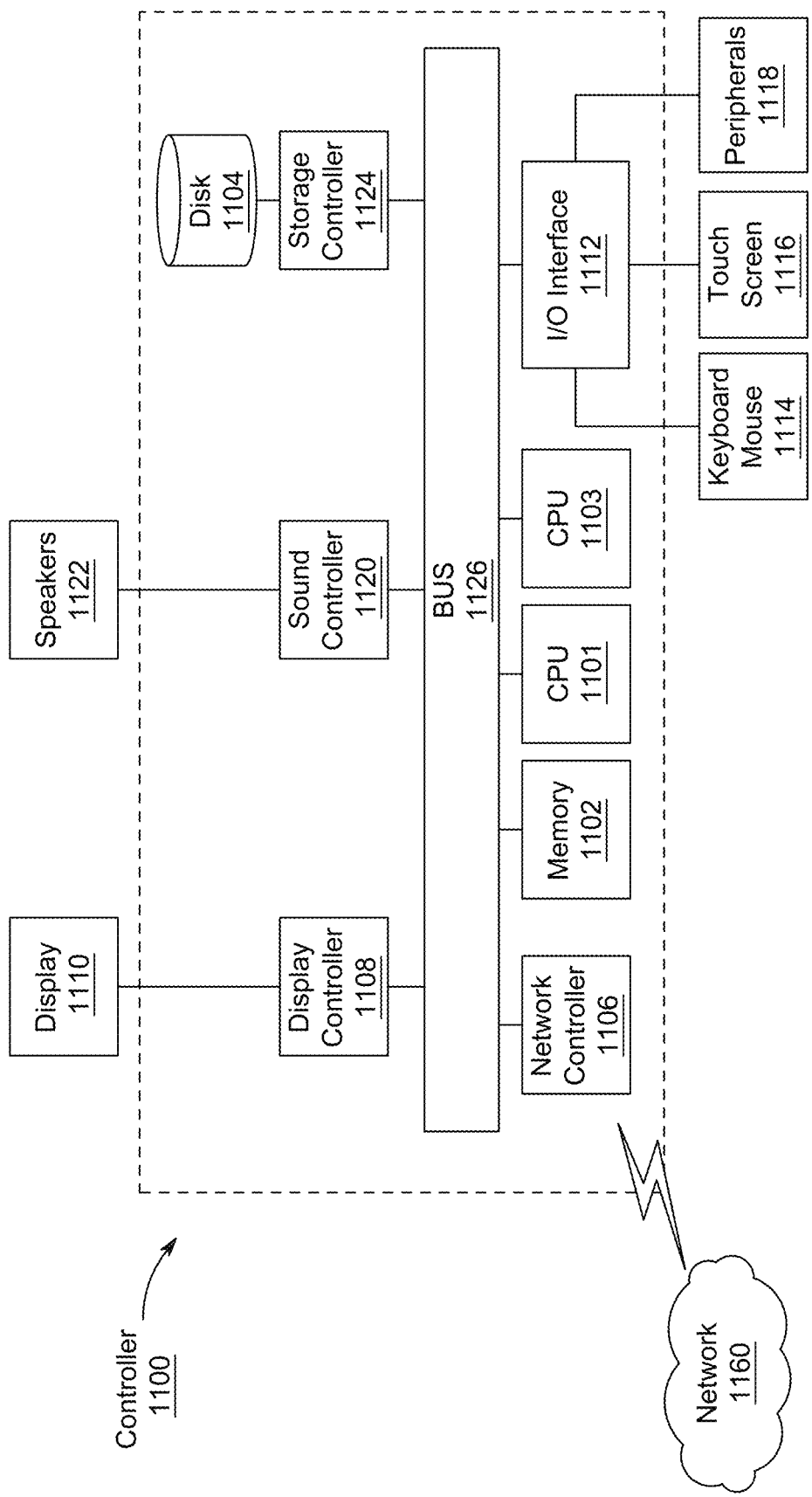
FIG. 11 is an illustration of a non-limiting example of details of computing hardware used in the computing system, according to certain embodiments.

Next, further details of the hardware description of the computing environment of FIG. 1 according to exemplary embodiments is described with reference to FIG. 11. In FIG. 11, a controller 1100 is described is representative of the processing circuit 102 of FIG. 1 in which the controller is a computing device which includes a CPU 1101 which performs the processes described above/below. The process data and instructions may be stored in memory 1102. These processes and instructions may also be stored on a storage medium disk 1104 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1101, 1103 and an operating system such as Microsoft Windows 9, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 1101 or CPU 1103 may be a Xenon or Core processor from Intel of America or an Opteron processor from AMD of America, or may be other processor types that would be recognized by one of ordinary skill in the art. Alternatively, the CPU 1101, 1103 may be implemented on an FPGA, ASIC, PLD or using discrete logic circuits, as one of ordinary skill in the art would recognize. Further, CPU 1101, 1103 may be implemented as multiple processors cooperatively working in parallel to perform the instructions of the inventive processes described above.

The computing device in FIG. 11 also includes a network controller 1106, such as an Intel Ethernet PRO network interface card from Intel Corporation of America, for interfacing with network 1160. As can be appreciated, the network 1160 can be a public network, such as the Internet, or a private network such as an LAN or WAN network, or any combination thereof and can also include PSTN or ISDN sub-networks. The network 1160 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The computing device further includes a display controller 1108, such as a NVIDIA GeForce GTX or Quadro graphics adaptor from NVIDIA Corporation of America for interfacing with display 1110, such as a Hewlett Packard HPL2445w LCD monitor. A general purpose I/O interface 1112 interfaces with a keyboard and/or mouse 1114 as well as a touch screen panel 1116 on or separate from display 1110. General purpose I/O interface also connects to a variety of peripherals 1118 including printers and scanners, such as an OfficeJet or DeskJet from Hewlett Packard.

A sound controller 1120 is also provided in the computing device such as Sound Blaster X-Fi Titanium from Creative, to interface with speakers/microphone 1122 thereby providing sounds and/or music.

The general purpose storage controller 1124 connects the storage medium disk 1104 with communication bus 1126, which may be an ISA, EISA, VESA, PCI, or similar, for interconnecting all of the components of the computing device. A description of the general features and functionality of the display 1110, keyboard and/or mouse 1114, as well as the display controller 1108, storage controller 1124, network controller 1106, sound controller 1120, and general purpose I/O interface 1212 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 12.

Figure 12:
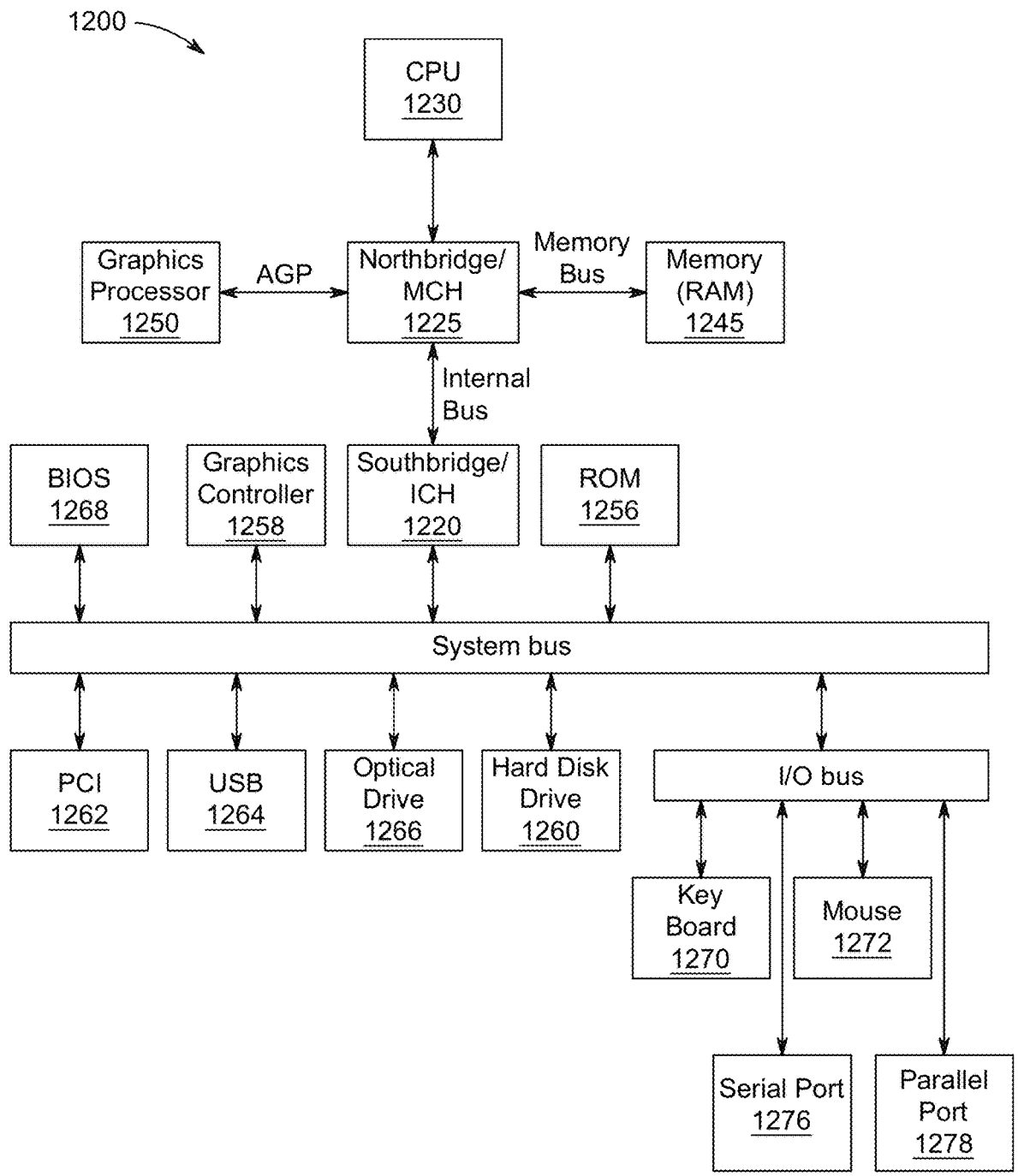
FIG. 12 is an exemplary schematic diagram of a data processing system used within the computing system, according to certain embodiments.

FIG. 12 shows a schematic diagram of a data processing system 1200 used within the computing system, according to exemplary aspects of the present disclosure. The data processing system 1200 is an example of a computer in which code or instructions implementing the processes of the illustrative aspects of the present disclosure may be located.

In FIG. 12, data processing system 1200 employs a hub architecture including a north bridge and memory controller hub (NB/MCH) 1225 and a south bridge and input/output (I/O) controller hub (SB/ICH) 1220. The central processing unit (CPU) 1230 is connected to NB/MCH 1225. The NB/MCH 1225 also connects to the memory 1245 via a memory bus, and connects to the graphics processor 1250 via an accelerated graphics port (AGP). The NB/MCH 1225 also connects to the SB/ICH 1220 via an internal bus (e.g., a unified media interface or a direct media interface). The CPU Processing unit 1230 may contain one or more processors and even may be implemented using one or more heterogeneous processor systems.

Figure 13:
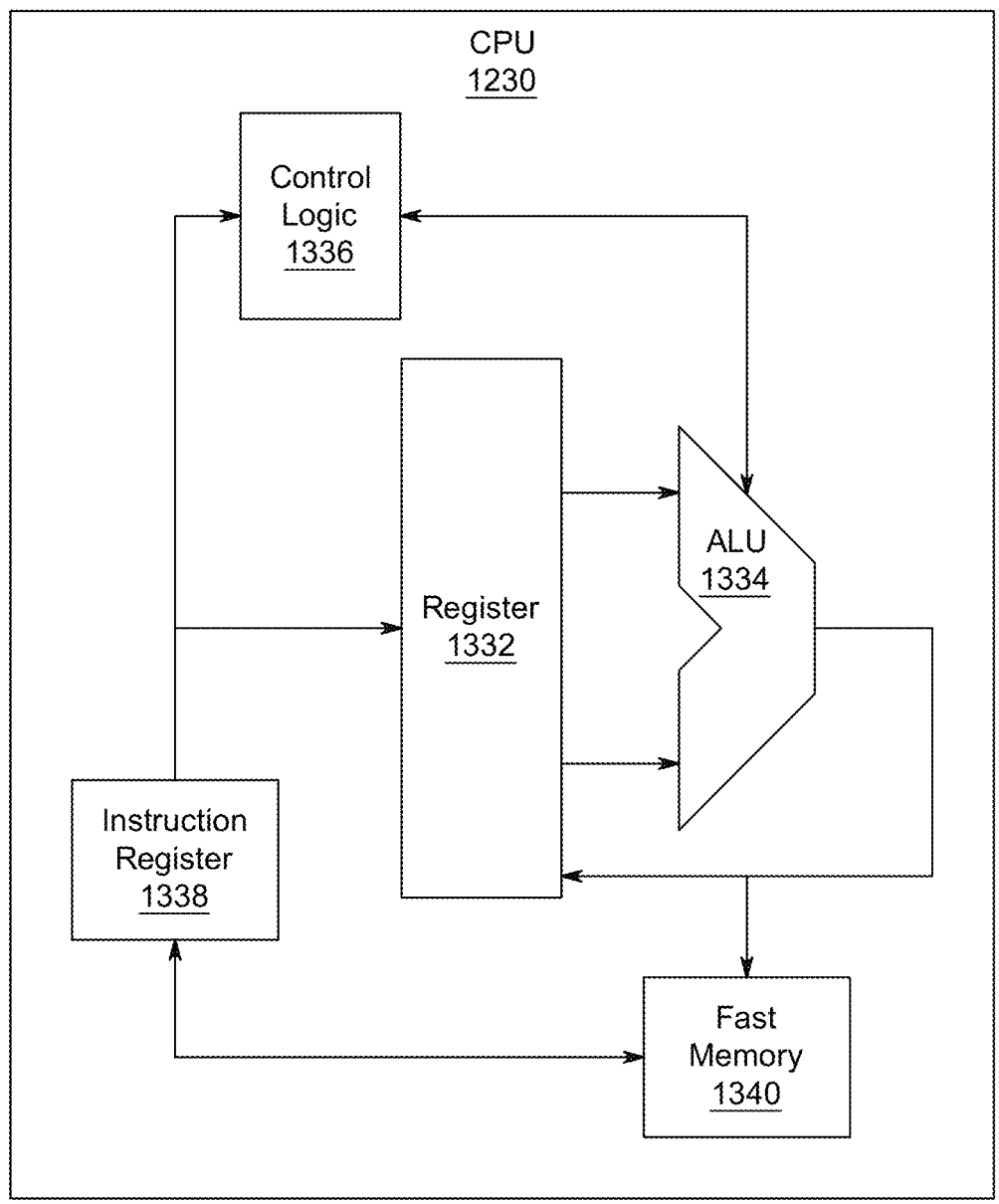
FIG. 13 is an exemplary schematic diagram of a processor used with the computing system, according to certain embodiments.

For example, FIG. 13 shows one aspects of the present disclosure of CPU 1230. In one aspects of the present disclosure, the instruction register 1338 retrieves instructions from the fast memory 1340. At least part of these instructions is fetched from the instruction register 1338 by the control logic 1336 and interpreted according to the instruction set architecture of the CPU 1230. Part of the instructions can also be directed to the register 1332. In one aspects of the present disclosure the instructions are decoded according to a hardwired method, and in other aspects of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 1334 that loads values from the register 1332 and performs logical and mathematical operations on the loaded values according to the instructions. The results from these operations can be feedback into the register and/or stored in the fast memory 1340. According to certain aspects of the present disclosures, the instruction set architecture of the CPU 1230 can use a reduced instruction set architecture, a complex instruction set architecture, a vector processor architecture, a very large instruction word architecture. Furthermore, the CPU 1230 can be based on the Von Neuman model or the Harvard model. The CPU 1230 can be a digital signal processor, an FPGA, an ASIC, a PLA, a PLD, or a CPLD. Further, the CPU 1230 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 12, the data processing system 1200 can include that the SB/ICH 1220 is coupled through a system bus to an I/O Bus, a read only memory (ROM) 1256, universal serial bus (USB) port 1164, a flash binary input/output system (BIOS) 1168, and a graphics controller 1158. PCI/PCIe devices can also be coupled to SB/ICH 1120 through a PCI bus 1162.

The PCI devices may include, for example, Ethernet adapters, add-in cards, and PC cards for notebook computers. The Hard disk drive 1160 and CD-ROM 1156 can use, for example, an integrated drive electronics (IDE) or serial advanced technology attachment (SATA) interface. In one aspects of the present disclosure the I/O bus can include a super I/O (SIO) device.

Further, the hard disk drive (HDD) 1160 and optical drive 1166 can also be coupled to the SB/ICH 1120 through a system bus. In one aspects of the present disclosure, a keyboard 1170, a mouse 1172, a parallel port 1178, and a serial port 1176 can be connected to the system bus through the I/O bus. Other peripherals and devices that can be connected to the SB/ICH 1220 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 14:
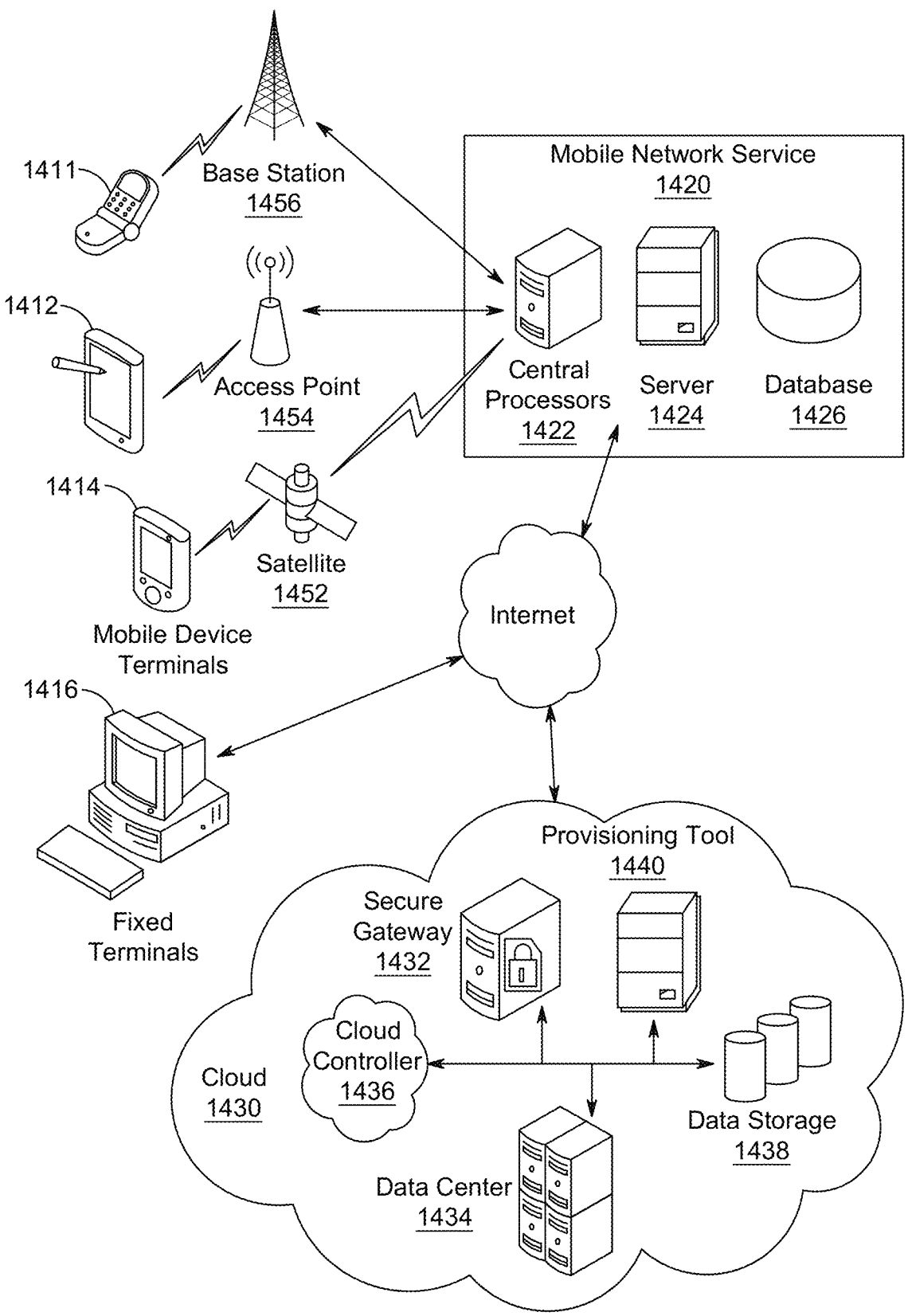
FIG. 14 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 14, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

What is claimed is:

1. A method of distributing content to a plurality of nodes on a computer network, the method comprising:

dividing the content into a plurality of information groups, each of the information groups including a mutually exclusive subset of information pieces of the content;

encoding the information pieces included in each of the plurality of information groups based on a combination of the information pieces included in the respective information group and a plurality of coefficients associated with the information pieces included in the respective information group; and distributing the encoded information pieces to the plurality of nodes on the computer network, wherein each of the information pieces is encoded into one of three types of information pieces, all the coefficients associated with a first type of the three types of information pieces are one, a subset of the coefficients associated with a second type of the three types of information pieces is from a Galois Field and the remaining coefficients associated with the second type of the three types of information pieces are one, and all the coefficients associated with a third type of the three types of information pieces are from the Galois Field.

2. The method of claim 1, wherein a number of the subset of the coefficients that is associated with the second type of information pieces and from the Galois Field is one.

3. The method of claim 1, wherein each of the second type of information pieces is decoded based on one of the first type of information pieces.

4. The method of claim 1, wherein each of the third type of information pieces is decoded after all the information pieces of the content are received.

5. The method of claim 1, wherein a first node of the plurality of nodes requests the content from a second node of the plurality of nodes, and the method further comprises:

sending, by the first node, multiple requests to the second node;

in response to each of the multiple requests sent by the first node, sending, by the second node, one of the second type of information pieces and one of the third type of information pieces to the first node;

decoding, by the first node, the one of the second type of information pieces; and storing, by the first node, the one of the third type of information pieces.

6. The method of claim 1, wherein one of the plurality of nodes requests the content from a subset of the plurality of nodes, and the method further comprises:

sending, by the one of the plurality of nodes, a different number to each of the subset of the plurality of nodes; and receiving, by the one of the plurality of nodes, a different subset of the information pieces from each of the subset of the plurality of nodes based on the different number sent to the respective one of the subset of the plurality of nodes.

7. The method of claim 6, wherein each of the different numbers sent to the subset of the plurality of nodes is less than a total number of the subsets of the plurality of nodes.

8. A system for distributing content to a plurality of nodes on a computer network, the system comprising:

processing circuitry configured to:

divide the content into a plurality of information groups, each of the information groups including a mutually exclusive subset of information pieces of the content;

encode the information pieces included in each of the plurality of information groups based on a combination of the information pieces included in the respective information group and a plurality of coefficients associated with the information pieces included in the respective information group; and distribute the encoded information pieces to the plurality of nodes on the computer network, wherein each of the information pieces is encoded into one of three types of information pieces, all the coefficients associated with a first type of the three types of information pieces are one, a subset of the coefficients associated with a second type of the three types of information pieces is from a Galois Field and the remaining coefficients associated with the second type of the three types of information pieces are one, and all the coefficients associated with a third type of the three types of information pieces are from the Galois Field.

9. The system of claim 8, wherein a number of the subset of the coefficients that is associated with the second type of information pieces and from the Galois Field is one.

10. The system of claim 8, wherein each of the second type of information pieces is decoded based on one of the first type of information pieces.

11. The system of claim 8, wherein each of the third type of information pieces is decoded after all the information pieces of the content are received.

12. The system of claim 8, wherein a first node of the plurality of nodes sends multiple requests to a second node of the plurality of nodes for requesting the content from the second node, and receives one of the second type of information pieces and one of the third type of information pieces from the second node in response to each of the multiple requests.

13. The system of claim 8, wherein one of the plurality of nodes sends a different number to each of a subset of the plurality of nodes for requesting the content from the subset of the plurality of nodes, and receives a different subset of the information pieces from each of the subset of the plurality of nodes based on the different number sent to the respective one of the subset of the plurality of nodes.

14. The system of claim 13, wherein each of the different numbers sent to the subset of the plurality of nodes is less than a total number of the subset of the plurality of nodes.

15. A non-transitory computer-readable medium storing instructions, which when executed by a processor for distributing content to a plurality of nodes on a computer network, cause the processor to perform:
dividing the content into a plurality of information groups, each of the information groups including a mutually exclusive subset of information pieces of the content;
encoding the information pieces included in each of the plurality of information groups based on a combination of the information pieces included in the respective information group and a plurality of coefficients associated with the information pieces included in the respective information group; and
distributing the encoded information pieces to the plurality of nodes on the computer network,
wherein each of the information pieces is encoded into one of three types of information pieces, all the coefficients associated with a first type of the three types of information pieces are one, a subset of the coefficients associated with a second type of the three types of information pieces is from a Galois Field and the remaining coefficients associated with the second type of the three types of information pieces are one, and all the coefficients associated with a third type of the three types of information pieces are from the Galois Field.

16. The non-transitory computer-readable medium of claim 15, wherein a number of the subset of the coefficients that is associated with the second type of information pieces and from the Galois Field is one.

17. The non-transitory computer-readable medium of claim 15, wherein each of the second type of information pieces is decoded based on one of the first type of information pieces.

18. The non-transitory computer-readable medium of claim 15, wherein each of the third type of information pieces is decoded after all the information pieces of the content are received.

19. The non-transitory computer-readable medium of claim 15, wherein a first node of the plurality of nodes sends multiple requests to a second node of the plurality of nodes for requesting the content from the second node, and receives one of the second type of information pieces and one of the third type of information pieces from the second node in response to each of the multiple requests.

20. The non-transitory computer-readable medium of claim 15, wherein one of the plurality of nodes sends a different number to each of a subset of the plurality of nodes for requesting the content from the subset of the plurality of nodes, and receives a different subset of the information pieces from each of the subset of the plurality of nodes based on the different number sent to the respective one of the subset of the plurality of nodes.

* * * * *